(12) United States Patent
Kori

(10) Patent No.: US 8,032,479 B2
(45) Date of Patent: Oct. 4, 2011

(54) STRING MATCHING SYSTEM AND PROGRAM THEREFOR

(75) Inventor: Mitsunori Kori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 799 days.

(21) Appl. No.: 11/792,564

(22) PCT Filed: Dec. 9, 2004

(86) PCT No.: PCT/JP2004/018348
§ 371 (c)(1),
(2), (4) Date: Jun. 7, 2007

(87) PCT Pub. No.: WO2006/061899
PCT Pub. Date: Jun. 15, 2006

(65) Prior Publication Data
US 2008/0109431 A1 May 8, 2008

(51) Int. Cl.
*G06F 15/00* (2006.01)
*G06F 15/18* (2006.01)
(52) U.S. Cl. .......................... 706/62; 706/45
(58) Field of Classification Search .................... 706/17, 706/22, 45, 62
See application file for complete search history.

(56) References Cited

U.S. PATENT DOCUMENTS

| | | | | |
|---|---|---|---|---|
| 4,764,863 | A * | 8/1988 | Silverthorn et al. | 714/39 |
| 5,051,886 | A * | 9/1991 | Kawaguchi et al. | 1/1 |
| 5,278,981 | A * | 1/1994 | Kawaguchi et al. | 1/1 |
| 5,995,963 | A * | 11/1999 | Nanba et al. | 1/1 |
| 7,539,681 | B2 * | 5/2009 | Norton et al. | 1/1 |
| 7,552,051 | B2 * | 6/2009 | Privault et al. | 704/255 |
| 2003/0051043 | A1 * | 3/2003 | Wyschogrod et al. | 709/230 |

(Continued)

FOREIGN PATENT DOCUMENTS

JP 7-129369 A 5/1995
(Continued)

OTHER PUBLICATIONS

Sengoku, "Minimization of Nondeterministic Finite Automata", Kyoto University, 1992, pp. 1-42.*
(Continued)

*Primary Examiner* — Omar Fernandez Rivas
(74) *Attorney, Agent, or Firm* — Birch, Stewart, Kolasch & Birch, LLP

(57) ABSTRACT

A string matching system comprises a state transition table generator for generating a state transition table based on a matching condition described in a regular expression, and an automaton for including a state that makes a transition according to the state transition table generated by the state transition table generator; if, in the state transition table generated based on the matching condition, there exists no next transition destination state with respect to a current-state and input-characters tuple, the automaton makes a transition to the initial state without proceeding to read input characters.

Furthermore, the string matching system comprises a state transition table generator for generating a state transition table based on matching conditions described in a regular expression, and an automaton that makes a transition according to the state transition table generated by the state transition table generator; if no next-transition destination state with respect to a current-state and input-character tuple exists in the state transition table generated based on the matching condition, then the state transition table generator determines an exclusion character based on which the automaton make a transition to a predetermined state without proceeding to read input characters, to generate a state transition table.

17 Claims, 32 Drawing Sheets

U.S. PATENT DOCUMENTS

| | | | |
|---|---|---|---|
| 2003/0065800 A1* | 4/2003 | Wyschogrod et al. | 709/230 |
| 2004/0117184 A1* | 6/2004 | Privault et al. | 704/251 |
| 2005/0035784 A1* | 2/2005 | Gould et al. | 326/46 |
| 2005/0273450 A1* | 12/2005 | McMillen et al. | 707/1 |
| 2006/0101195 A1* | 5/2006 | Jain | 711/104 |
| 2008/0077587 A1* | 3/2008 | Wyschogrod et al. | 707/6 |

FOREIGN PATENT DOCUMENTS

| | | |
|---|---|---|
| JP | 10-105576 A | 4/1998 |
| JP | 10-207912 | 8/1998 |
| JP | 2004-103034 A | 4/2004 |
| JP | 2004-103035 A | 4/2004 |

OTHER PUBLICATIONS

CodeCharge, www.support.yessoftware.com/kb_article.asp?article_id=63&printable=1, 2002, pp. 1-3.*

Masui, "Compressing State Transition Tables and Tries," Sharp Corporation, Jan. 1994, pp. 73-80.

Hopcroft et al., "Formal Languages and their Relation to Automata," Chapter 3, pp. 26-41, Addison Wesley, 1969.

* cited by examiner

MATCHING RESULT

REGULAR EXPRESSION a. b

REGULAR EXPRESSION [^a] b (a|b|c(d|e))f (a|b|c(d|e))f (a|b|c(d|a))f (a|b|c(d|a))f

CONDITION EQUATION

Fig. 45

| STATE NUMBER \ INPUT CHARACTER | a | b | c | d | $\sigma_{other}$ |
|---|---|---|---|---|---|
| 0 | 2 | -- | -- | -- | 1 |
| 1 | 2 | 12 | -- | -- | 1 |
| 2 | 5 | 8 | -- | -- | 12 |
| 3 | 2 | 12 | -- | 4 | 1 |
| 4 | 2 | 12 | -- | -- | 1 |
| 5 | 5 | 8 | 9 | -- | 12 |
| 6 | 5 | 8 | -- | 10 | 12 |
| 7 | 5 | 8 | -- | -- | 12 |
| 8 | 6 | 9 | 11 | -- | 3 |
| 9 | 2 | 12 | 3 | 4 | 1 |
| 10 | 2 | 12 | 3 | -- | 1 |
| 11 | 7 | 10 | -- | -- | 4 |
| 12 | 2 | 12 | 3 | -- | 1 |

Fig. 46

| STATE NUMBER | CONDITION NUMBER |
|---|---|
| 0 | -- |
| 1 | -- |
| 2 | -- |
| 3 | -- |
| 4 | 0 |
| 5 | -- |
| 6 | -- |
| 7 | 0 |
| 8 | -- |
| 9 | -- |
| 10 | 0 |
| 11 | -- |
| 12 | -- |

Fig. 47

| CURRENT STATE | INPUT CHARACTER σ | NEXT STATE OF σ | NEXT STATE OF σ_other | NEXT STATE | CONDITION NUMBER | REFERENCE COUNT OF STATE TRANSITION TABLE |
|---|---|---|---|---|---|---|
| 0 | a | 2 | (UNNECESSARY) | 2 | - | 1 |
| 2 | a | 5 | (UNNECESSARY) | 5 | - | 1 |
| 5 | c | 9 | (UNNECESSARY) | 9 | - | 1 |
| 9 | a | 12 | (UNNECESSARY) | 12 | - | 1 |
| 12 | - | - | - | - | - | |

Fig. 48

CONDITION EQUATION
17

| CONDITION NUMBER=0 | CONDITION DESCRIPTION = bcd | a.cd | ab.d | abc |
|---|---|
| 16 | 18 |

Fig. 49

| INPUT CHARACTER / STATE NUMBER | a | b | c | d | σ_other |
|---|---|---|---|---|---|
| 0 | 3 | 3 | -- | -- | -- |
| 1 | -- | -- | -- | 2 | -- |
| 2 | -- | -- | -- | -- | -- |
| 3 | 5 | 6 | -- | -- | 4 |
| 4 | -- | -- | 1 | -- | -- |
| 5 | 5 | 6 | 8 | -- | 4 |
| 6 | 7 | 8 | 9 | -- | 1 |
| 7 | 5 | 6 | -- | 10 | 4 |
| 8 | -- | -- | 1 | 2 | -- |
| 9 | -- | -- | -- | 2 | -- |
| 10 | -- | -- | 1 | -- | -- |

Fig. 50

| STATE NUMBER | CONDITION NUMBER |
|---|---|
| 0 | -- |
| 1 | -- |
| 2 | 0 |
| 3 | -- |
| 4 | 0 |
| 5 | -- |
| 6 | -- |
| 7 | 0 |
| 8 | -- |
| 9 | 0 |
| 10 | 0 |

Fig. 51

| CURRENT STATE | INPUT CHARACTER σ | NEXT STATE OF σ | NEXT STATE OF σ_other | NEXT STATE | CONDITION NUMBER | REFERENCE COUNT OF STATE TRANSITION TABLE |
|---|---|---|---|---|---|---|
| 0 | x | — | — | 0 | — | 2 |
| 0 | a | 3 | (UNNECESSARY) | 3 | — | 1 |
| 3 | b | 6 | (UNNECESSARY) | 6 | — | 1 |
| 6 | x | — | 1 | 1 | — | 2 |
| 1 | d | 2 | (UNNECESSARY) | 2 | — | 1 |
| 2 | — | — | — | — | 0 | |

Fig. 52

(([abcd! [^a] bcd|a [^b] cd | ab [^c] d | abc [^d])/A)

*WHERE [^c1,c2,...cm]REPRESENTS, AMONG THE CHARACTER SET Σ,
(d1|d2|...dn) OF ALL CHARACTERS d1, d2,..dn OTHER THAN c1, c2,...cm,
WHERE "|" REPRESENTS OR.

*THE ABOVE-DESCRIBED REGULAR CONVERSION CORRESPONDS TO A STRING SET
CONSTITUTED OF THE ENTIRETY OF STRINGS (aecd, adad,ETC.) RESULTING WHEN
ANY ONE CHARACTER AMONG STRINGS "abcd" AND "abcd" VARIES TO ANOTHER.

Fig. 53

```
******************** DMO ********************
```

| STATE | OUTPUT | $ | a | b | c | d |
|---|---|---|---|---|---|---|
| 1 | [ ] | 2 | 3 | 2 | 2 | 2 |
| 2 | [ ] | 2 | 3 | 4 | 2 | 2 |
| 3 | [ ] | 5 | 6 | 7 | 5 | 5 |
| 4 | [ ] | 2 | 3 | 4 | 8 | 2 |
| 5 | [ ] | 2 | 3 | 4 | 9 | 2 |
| 6 | [ ] | 5 | 6 | 7 | 10 | 5 |
| 7 | [ ] | 11 | 12 | 13 | 14 | 11 |
| 8 | [ ] | 2 | 3 | 4 | 2 | 15 |
| 9 | [ ] | 2 | 3 | 4 | 2 | 15 |
| 10 | [ ] | 2 | 3 | 4 | 9 | 15 |
| 11 | [ ] | 2 | 3 | 4 | 2 | 15 |
| 12 | [ ] | 5 | 6 | 7 | 5 | 16 |
| 13 | [ ] | 2 | 3 | 4 | 8 | 15 |
| 14 | [ ] | 15 | 17 | 18 | 15 | 15 |
| 15 | [ A] | 2 | 3 | 4 | 2 | 2 |
| 16 | [ A] | 2 | 3 | 4 | 9 | 2 |
| 17 | [ A] | 2 | 6 | 7 | 5 | 5 |
| 18 | [ A] | 2 | 3 | 4 | 8 | 2 |

```
****************************************************
```

TOTAL 57 ARCS

Fig. 54

```
******************** FMO ********************
```

| STATE | OUTPUT | $ | a | b | c | d | fail |
|---|---|---|---|---|---|---|---|
| 1 | [ ] | 2 | 3 | 2 | 2 | 2 | -- |
| 2 | [ ] | -- | -- | 4 | -- | -- | 1 |
| 3 | [ ] | 5 | 6 | 7 | 5 | 5 | -- |
| 4 | [ ] | -- | -- | -- | 8 | -- | 2 |
| 5 | [ ] | -- | -- | -- | 9 | -- | 2 |
| 6 | [ ] | -- | -- | -- | 10 | -- | 3 |
| 7 | [ ] | 11 | 12 | 13 | 14 | 11 | -- |
| 8 | [ ] | -- | -- | -- | -- | 15 | 2 |
| 9 | [ ] | -- | -- | -- | -- | 15 | 2 |
| 10 | [ ] | -- | -- | -- | -- | 15 | 5 |
| 11 | [ ] | -- | -- | -- | -- | 15 | 2 |
| 12 | [ ] | -- | -- | -- | -- | 16 | 3 |
| 13 | [ ] | -- | -- | -- | -- | 15 | 4 |
| 14 | [ ] | 15 | 17 | 18 | 15 | 15 | -- |
| 15 | [ A] | -- | -- | -- | -- | -- | 2 |
| 16 | [ A] | -- | -- | -- | -- | -- | 5 |
| 17 | [ A] | -- | -- | -- | -- | -- | 3 |
| 18 | [ A] | -- | -- | | | | 4 |

```
****************************************************
```

TOTAL 44 ARCS

STRING MATCHING SYSTEM AND PROGRAM THEREFOR

TECHNICAL FIELD

The present invention relates to technologies for matching characters in a sentence with a pattern designated based on regular expressions.

BACKGROUND ART

In recent years, document digitization has been in progressing a variety of fields, thus leading to requests for a method of effectively searching documents. A method of searching includes that of matching characters in a document with a pattern designated based on regular expressions. The regular expressions, which are set forth in, e.g., Non-Patent Document 1, are notation that represents a class of languages as referred to as regular languages. It is well known in the art that a string matching technique in which the regular expressions are used as search conditions is based on a DFA (deterministic finite automaton).

The string matching technique by the DFA is based upon a model of a state transition machine (an automaton). The state transition machine incorporates a state and a state transition function. The state transition function is a function that determines the next state with respect to a current state and input characters. In the string matching technique using the DFA, the state transition machine reads input text on a character-by-character basis, and makes a transition to the next state obtained by applying the state transition function to a current-state and input-characters tuple. This method allows matching to be performed by scanning the text only once without backtracking, thereby enabling high-speed string matching to be performed. When matching based on a plurality of conditions is performed, a finite automaton (Moore machine) with output is also employed such that the DFA is expanded and the output is defined for each state in order to distinguish conditions under which matching has successfully been performed.

While a DFA state transition function is determined by a regular expression that is to be a matching condition, there has been a procedure that temporarily converts regular expression into an NFA (nondeterministic finite automaton) and then the NFA, in turn, into the DFA, which is well known and set forth in, e.g., Non-Patent Document 1. The string matching technique by the DFA has a feature that provides high-speed processing, which, in contrast, has raised a drawback in that a state transition table for achieving the DFA state transition function tends to be enormous.

A matching condition shown in FIG. 52, which is disclosed in Patent Document 3, is taken as an example. Shown in FIG. 53 are, in a finite automaton with conventional output, a failed function and a state transition table that are generated from the matching condition shown in FIG. 52. In this way, the state transition table that retains 90 different tuples with respect to the state number of 18 and five character kinds, needs to be generated.

As a method to solve such problem, Patent Document 1 and Patent Document 2 illustrate a method of reducing memory capacity in the state transition table, by removing, after converting into the DFA the state transition table based upon the AC (Aho-Corasick) technique, from the state transition table the transition operations to an initial state and its next state. The string matching techniques shown in Patent Document 1 and Patent Document 2, however, does not permit a general regular expression to be a matching target because of the matching target being limited to fixed string keywords.

By defining the failed function in the DFA, Patent Document 3 also indicates a method of reducing the state transition table. The method shown in Patent Document 3 may in some cases result in another failure of transition in a state in which the transition has been once made by the failed function—in other words, transition failure could in some situations chain-react. In such a case, a problem has been that there is a need for references to be repeatedly made to the failed function, thus resulting in the matching speed being reduced.

The matching condition shown in FIG. 52, which is disclosed in Patent Document 3, is taken as an example. Shown in FIG. 54 are the failed function and the state transition table that are generated from the matching condition in FIG. 52, which is disclosed in Patent Document 3.

A case where the matching condition is that shown in FIG. 52 and an input string consists of "aaca," is taken as an example.

The method disclosed in Patent Document 3 first initializes a state to State 1. Next, a first character "a" is read, the state makes a transition to State 3 as indicated in the column of the input character "a" in the line of State 1 in the state transition table. Then, a character "a" is read, in a similar fashion, the state making a transition form State 3 to State 6. Then, reading the third character "c" results in the state making a transition from State 6 to State 10. Since, when a fourth character "a" appears next, however, there exists no transition destination corresponding to the character "a," the state first makes a transition to State 5 that is the transition destination when the state fails in its transition to State 10. Furthermore, because State 5 has no transition destination corresponding to the character "a," the state makes a transition to State 2, which is the transition destination when the state fails in its transition to State 5. However, the fact that no transition destination corresponding to the character "a" exists in State 2 either causes the state to make a transition to State 1, which is the transition destination when the state fails in its transition to State 2. The fact that in State 1 there exists State 3 of the transition destination corresponding to the character "a" leads to the state transitioning to State 3. As described above, four times in total of references to the state transition table and their state transitions, are made with respect to a fourth input character, which requires a total of seven times of the state transition with respect to four input characters. In this manner, the method according to Patent Document 3 may in some cases repeat failures in state transitions and requires making a reference to a transition destination for every failure of the transition. A problem has been that, for this reason, the frequency of references of the state transition table increases, which results in matching performance degradation.

Non-Patent Document 1
E. J. Hopcroft, D. J. Ullman, "Formal Languages and their Relation to Automata," Addison Wesley (1969)
Patent Document 1
Japanese Unexamined Patent Application Publication 2004-103035
Patent Document 2
Japanese Unexamined Patent Application Publication 2004-103034
Patent Document 3
Japanese Unexamined Patent Application Publication 2994926

DISCLOSURE OF THE INVENTION

Problem that the Invention is to Solve

The present invention is directed to solve the above described problem and an object is to reduce memory capacity needed to store a state transition table with respect to string matching in which regular expressions are used as the matching conditions.

Another object is that a reference count of the state transition due to a transition failure is limited to two or less per character, and performance degradation due to repeated transition failures is prevented, thus enabling high speed string matching to be performed.

Means for Solving the Problem

String matching system associated with the present invention comprises a state transition table generated that generates a state transition table based on matching conditions described in regular expressions, as well as an automaton makes a transition according to the state transition table generated by the state transition table generator; if no next-transition destination with respect to a current-state and input-characters tuple exists in the state transition table generated based on the matching conditions, the automaton makes a transition back to its initial state without proceeding to read the input characters.

Effects of the Invention

A string matching system associated with the present invention comprises a state transition table generator that generates a state transition table based on matching conditions described in regular expressions, as well as an automaton that makes a transition according to the state transition table generated by the state transition table generator; if no next transition destination with respect to a current-state and input-characters tuple exists in the state transition table generated based on the matching conditions, memory capacity needed to store the state transition table can be reduced in such a way that the automaton makes a transition back to its initial state without proceeding to read the input characters.

BRIEF DESCRIPTION OF DRAWINGS

FIG. 45 is an explanatory diagram illustrating a configuration of a state transition table;

FIG. 46 is an explanatory diagram illustrating an output table;

FIG. 47 is an explanatory diagram illustrating an operation example;

FIG. 48 is an explanatory diagram illustrating a configuration of the matching condition;

FIG. 49 is an explanatory diagram illustrating a configuration of the state transition table;

FIG. 50 is an explanatory diagram illustrating a configuration of the output table;

FIG. 51 is an explanatory diagram illustrating another operation example;

FIG. 52 shows a matching condition as disclosed in Patent Document 3;

FIG. 53 is a conventional state transition table with output according to Patent Document 3; and FIG. 54 is a conventional state transition table and output table according to Patent Document 3:

[Reference Numerals]

| | | | |
|---|---|---|---|
| 1 | String matching system | 2 | Matching conditions |
| 3 | State transition table generator | 4 | State transition table storage |
| 5 | Output table storage | 6 | Input document |
| 7 | Input character reader | 8 | SDFA automaton |
| 9 | State storage | 10 | Matching result |
| 11 | State transitions | 12 | Output descriptions |
| 13 | Current state | 14 | Input characters |
| 15 | Next state | 16 | Condition number |
| 17 | Condition equation | 18 | Condition description |
| 21 | State transition table generation control | 22 | NFA state set |
| 23 | NFA state transition set | 24 | NFA state description set |
| 25 | State set | 26 | State transition set |
| 27 | Output description set | 31 | Hash value calculator |
| 32 | Hash value | 33 | State transition hash pointer |
| 34 | State transition hash chain | 35 | State transition hash table |
| 36 | Comparator | 41 | Condition number index |
| 42 | Condition number chain | | |

BEST MODE FOR CARRYING OUT THE INVENTION

Embodiment 1

Figure 1:
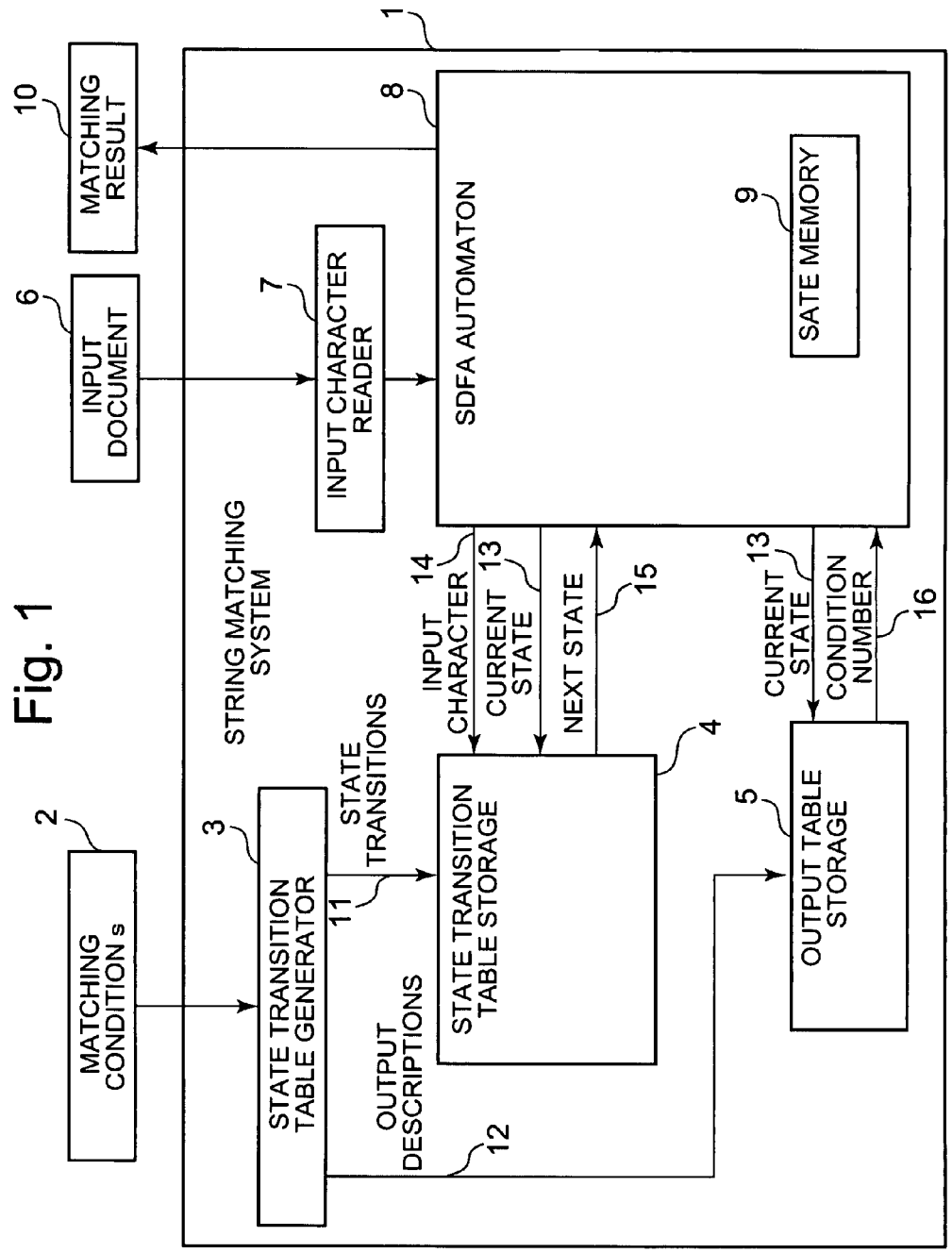
FIG. 1 is an explanatory diagram illustrating a configuration of a string matching system.

FIG. 1 is an explanatory diagram illustrating a configuration of a string matching system.

Referring to FIG. 1, a string matching system 1, which is a system in the present invention for matching a string against a regular expression, delivers output as a matching result 10, as to whether or not some satisfying matching conditions 2 are contained in an input document 6. The matching conditions 2 describe string matching conditions, being inputted to the string matching system 1. A state transition generator 3 generates from the matching conditions 2 state transitions 11 and output descriptions 12, delivering them to a state transition table storage 4 and an output table storage 5, respectively. The state transition table storage retains a state-transition-11 tuple. The output table storage 5 retains the output descriptions 12. The input document 6 is a target document that is to be matched. An input character reader 7 extracts characters one by one, contained in the input document 6, sending them as input characters 14, to an SDFA automaton 8. The SDFA automaton 8 stores a current state 13 into a state memory 9, and receives input characters 14 from the input character reader 7. By making references to the state transition table storage 4 and the output table storage 5, the automaton 8 renews the current state 13 stored in the state memory 9 and outputs the matching result 10. The state memory 9 stores a state retained inside the SDFA automan 8. Reference Numeral 10 shows the matching result. Reference Numeral 11 is the state transition, being current state 13, input characters 14 and next-state-15 tuple. Reference Numeral 12, which is the output description, is a current state 13 and condition number 16 tuple. Reference Numeral 13 is the current state; Reference Numeral 14, the input characters; Reference Numeral 15, the next state; and Reference Numeral 16, a condition number.

Figure 2:
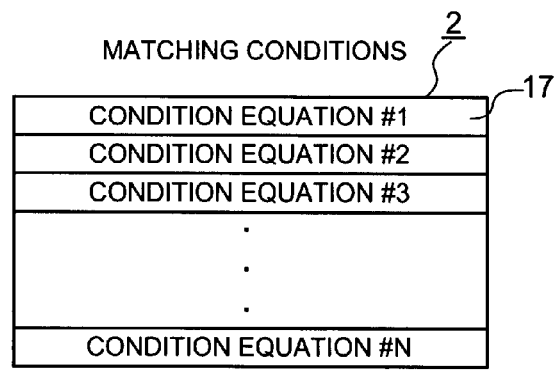
FIG. 2 is an explanatory diagram illustrating a configuration of matching conditions 2.

FIG. 2 is an explanatory diagram illustrating a configuration of the matching conditions 2 in the present invention. Referring to the figure, a condition equation 17 is an individual condition configuring the matching conditions 2, in which one or a plurality of such condition equations 17 is contained.

Figure 3:
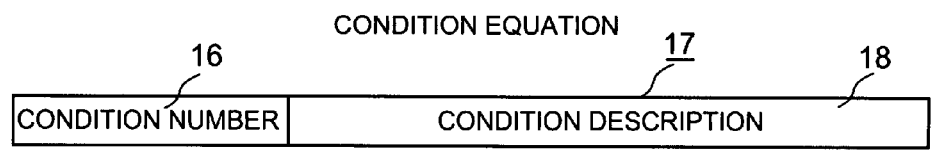
FIG. 3 is an explanatory view illustrating a configuration of a condition equation 17.

FIG. 3 is a diagram illustrating a configuration of the condition equation 17 in the present invention. The condition equation 17 is configured by the condition number 16, which is a number for uniquely distinguishing the condition equation, and a condition description 18, which denotes matching conditions described in the regular expression.

Figure 4:
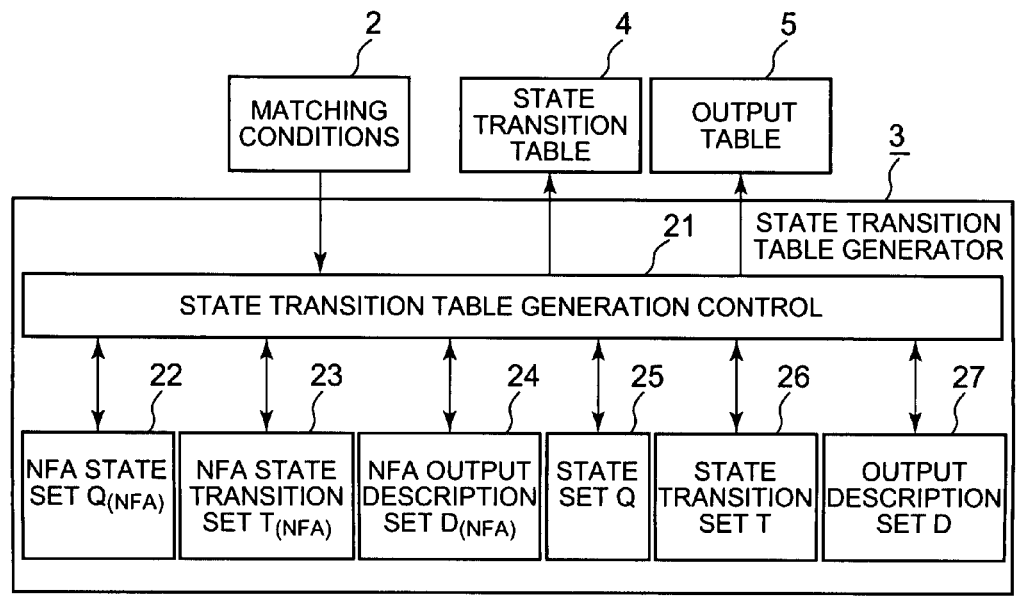
FIG. 4 is an explanatory diagram illustrating a configuration of a state transition table generator 3.

FIG. 4 is a diagram illustrating a configuration of a matching condition 3 in the present invention. Referring to the figure, a state transition table generation control 21 controls an operational procedure for generating a state transition generation table. An NFA state set 22, an NFA state transition set 23, an NFA output description set 24, a state set 25, an output transition set 26, and a state description set 27 are data to which the state transition table generation control 21 makes reference.

Figure 5:
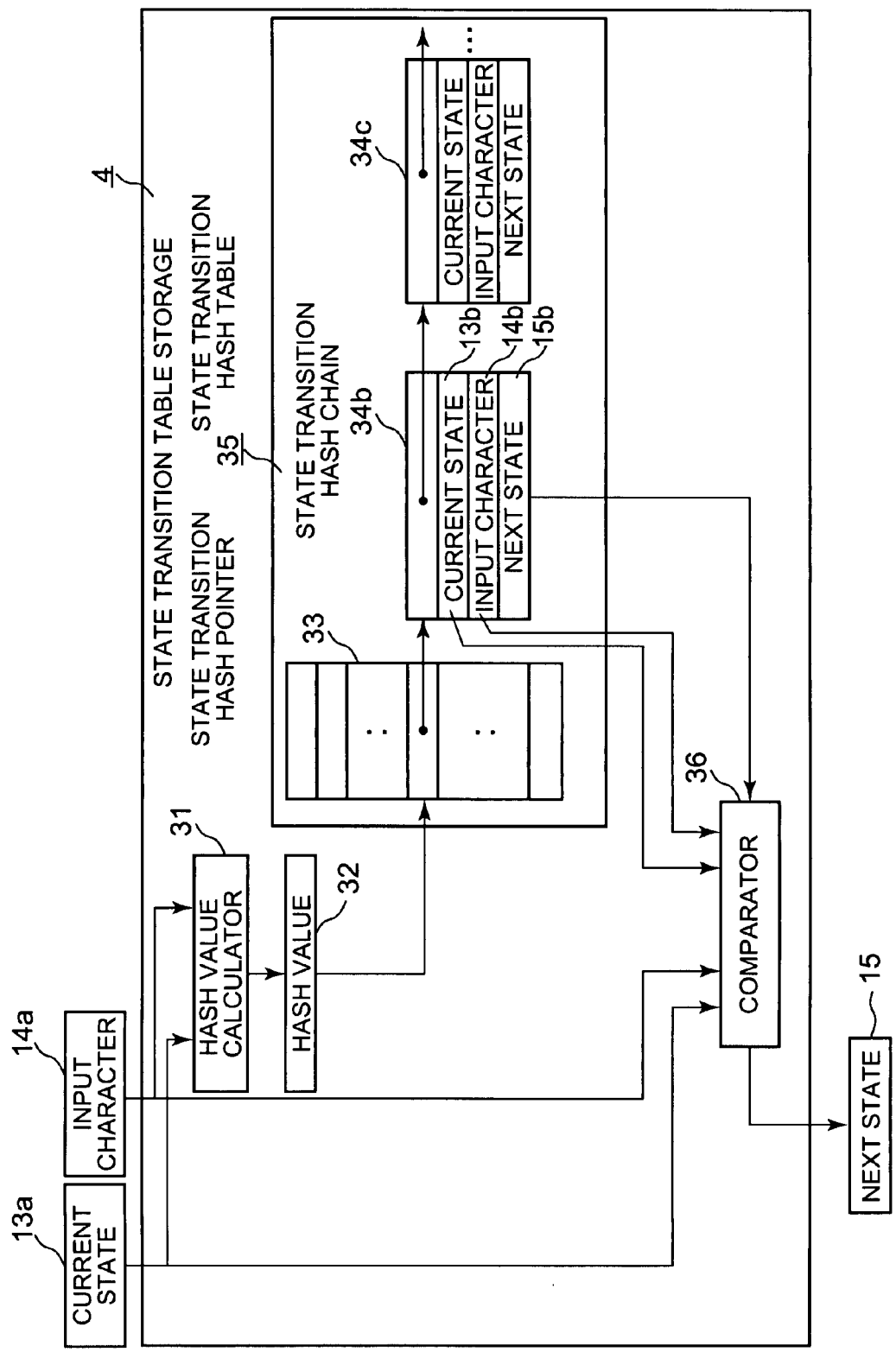
FIG. 5 is an explanatory diagram illustrating a configuration of a state transition table storage 4.

FIG. 5 is a diagram illustrating an example of a configuration of the state transition table storage 4 in the present invention. Referring to the figure, Reference Numeral 31 represents a hash value calculator, which computes a has value 32 from the current state 13 and the input characters 14. The has value 32 is a value computed using the hash value calculator 31. A state transition hash pointer 33 is a table that stores a plurality of pointers of a state transition hash chain 34. The state transition hash chain 34 is a pointer, current-state-13, input-character-14 and next-state-15 tuple thereto. A state transition hash table 35 is a data structure that is constituted of the state transition hash pointer 33 and the state transition hash chain 34. A comparator 36 compares a tuple of a current state 13a and input characters 14a inputted from outside, with that of a current state 13b and input characters 14b stored in the state transition hash table 35, to output the next state.

Figure 6:
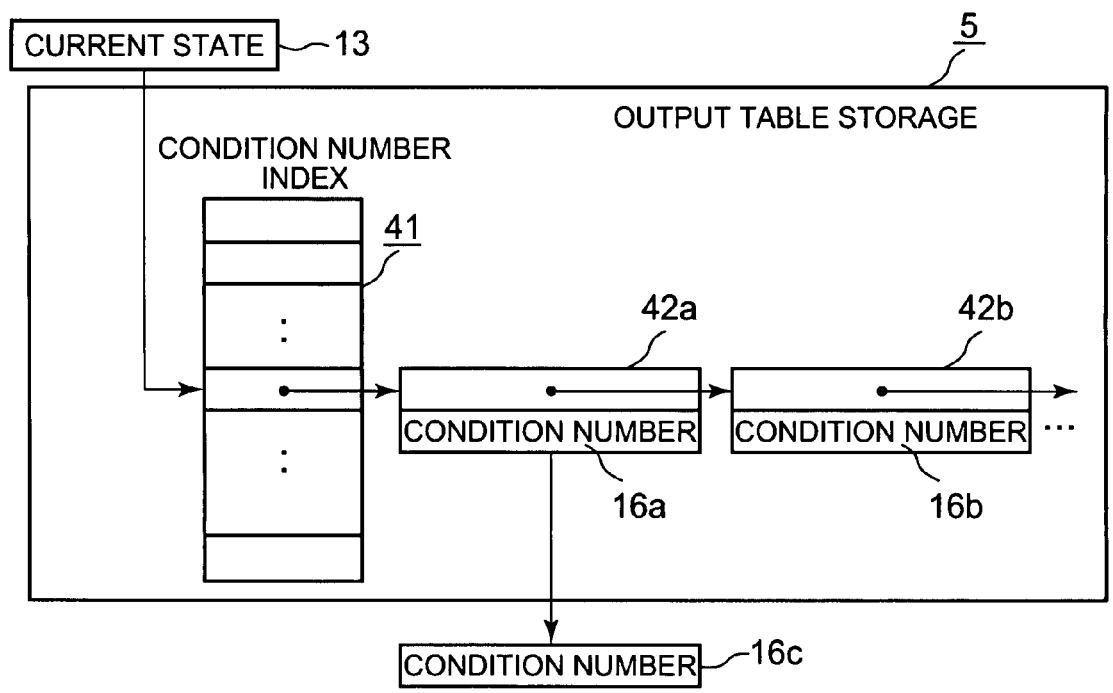
FIG. 6 is an explanatory diagram illustrating a configuration of an output table storage 5.

FIG. 6 is a diagram illustrating a configuration of the output table storage 5 in the present invention. A condition number index 41 stores a plurality of pointers for a condition number chain. The condition number chin 42 is a pointer and condition-number-16 tuple therefor.

Figure 7:
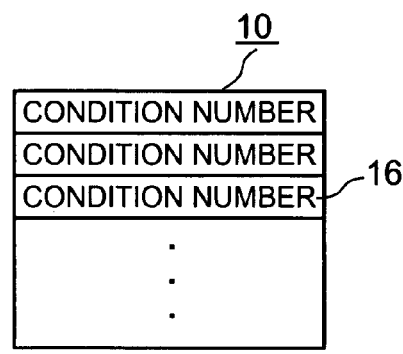
FIG. 7 is an explanatory diagram illustrating a configuration of a matching result 10.

FIG. 7 is a diagram illustrating an example of the matching result 10 in the present invention. The matching result 10 includes the condition number 16 by which the input document 6 has been successfully matched.

Prior to explanations on the system's operation of the present invention, terms and symbols that are employed in the following explanation will be described next.

As is set forth in Non-Patent Document 1 and the like, a well-known deterministic finite automaton with output is given by a tuple of $(Q, \Sigma, \Delta, \delta, \lambda, q_o)$, where $Q$ is a state set; $\Sigma$ is an input alphabet, including an empty character $\epsilon$; $\Delta$ is an output alphabet; $\delta$, a transition function $(Q \times \Sigma \to Q)$; $\lambda$, an output function $(Q \to \Delta)$; and $q_o$, an initial state.

The SDFA automaton 8 of the present invention is given by a tuple of $(Q_s, \Sigma_s, \Delta_s, \delta_s, \lambda_s, q_o)$.

Here, $Q_s$ is the state set 25, corresponding to the state set Q of the conventional deterministic finite automaton with output.

Symbol $\Delta_s$, which is an output alphabet, is a set of sets of such condition numbers 16 in the embodiment.

Symbol $\delta_s$ is a state transition function to be implemented by the state transition table storage 4; when the current state 13 is $q_s$, and the input characters 14 are $\sigma_s$, the next state 15 turn out to be $q_d$, which is represented as $\delta_s(q_s, \sigma_s)=q_d$, hereinafter.

Symbol $q_o$ is the initial state, which means the same as that in the well-known deterministic finite automaton with output.

Symbol $\Sigma_s$ is an extended input alphabet in which an arbitrary character $\sigma_{any}$ and an exclusion character $\sigma_{other}$ are added to the input alphabet $\Sigma$ in the conventional finite automaton with output, that is, it is represented that $\Sigma_s = \Sigma \cup \{\sigma_{any}, \sigma_{other}\}$.

Also, when $\delta_s(q_s, \sigma_s)=q_d$, if the state transitions 11 is assigned as t, then, it is represented that $t=\text{trans}(q_s, q_d, \sigma_s)$.

A set of the state transitions 11 in which the next state 15 exists with respect to an input-character-14 and current-state-13 tuple, is referred to as the state transition set 26, being represented as T. Moreover, for the state transition $t=\text{trans}(q_s, q_d, \sigma_s)$, $q_s$, $q_d$, and $\sigma_s$ are referred to as the start point, the end point, and a transition character, respectively. Furthermore, a function to give the start point of the state transition t is referred to as Source, the end point, Destination; and the transition character, Char. Each of them is represented as $q_s=\text{Source}(t)$, $q_d=\text{Destination}(t)$ and $\sigma_s=\text{Char}(t)$, and given that, when $\lambda_s(q_s)=r$, the output description 18 is d, it is represented as $d=\text{desc}(q_s, r)$.

A set of such output descriptions 12 in which with respect to the current state 13 an output alphabet r is not empty, is referred to as the output description set 27, being represented as D. With respect to the output description $d=\text{desc}(q_s, r)$, $q_s$ is referred to as an output state; r, an output result. Furthermore, a function giving the output state of the output description d is referred to as State and a function giving the output result, as Result, and each of them is represented as $q_s=\text{State}(d)$ and $r=\text{Result}(d)$, respectively.

An NFA, which is generated in the process of generating the SDFA automaton 8 in the present invention, is represented by a tuple of $(Q_{(NFA)}, \Sigma_s, \Delta_s, \delta_{s(NFA)}, \lambda_{s(NFA)}, q_{0(NFA)})$.

Here, $Q_{(NFA)}$ represents the NFA state set 22; the state set 25 turns out to be a set of NFA state sets, i.e., when the state set 25 is represented as Q, there is a relationship that holds for $Q=2^{Q(NFA)}$. In order to hereinafter distinguish an NFA state from a DFA state, the NFA state is represented as $q_{(NFA)}$, and the initial state of the NFA, as $q_{0(NFA)}$.

Symbol $\delta_{s(NFA)}$, which is a state transition function of the NFA, is a function of a set in a case where with respect to the input characters 14 the automaton makes a transition to a next state based on $\sigma_s$ when the current NFA state 13 is $q_{(NFA)}$.

Symbol $\lambda_{s(NFA)}$ is an output function of the NFA, and when the current NFA state 13 is $q_{(NFA)}$, the fact that the output alphabet turns out to be $r \in \Delta_s$ is represented as $\lambda_{s(NFA)}(q_{(NFA)})=r$.

Symbol $\Delta_s$ is a set of such condition numbers 16, and $\Sigma_s$ is the extended input alphabet, both of which mean the same as those in the SDFA automaton of the present invention.

Regarding the NFA state, its transition is defined as follows: when the NFA state $q_{d(NFA)}$ has a relationship of $q_{d(NFA)} \in \delta(q_{s(NFA)}, \sigma_s)$, the NFA state transition 32 is represented as $t_{(NFA)}=\text{trans}(q_{s(NFA)}, q_{d(NFA)}, \sigma_s)$. A set of the NFA state transition is referred to as an NFA state transition set, being represented as $T_{(NFA)}$. Similarly, with respect to the state transition $t_{(NFA)}=\text{trans}(q_{s(NFA)}, q_{d(NFA)}, \sigma_s)$, $q_{s(NFA)}$ is referred to as the start point; $q_{d(NFA)}$, the end point; and $\sigma_s$, the transition character. Furthermore, a function giving the start point of the state transition $t_{(NFA)}$ is referred to as Source; the end point, as Destination; and the transition character, as Char. Each of them is represented as $q_{s(NFA)}=\text{Source}(t)$, $q_{d(NFA)}=\text{Destination}(t)$, and $\sigma_{s(NFA)}=\text{Char}(t)$.

An NFA-state-$q_{s(NFA)}$ and output-alphabet-r tuple is referred to as NFA output description. Given that, when $\lambda_s(q_{s(NFA)})=r$, the output description 34 is assigned as $d_{(NFA)}$, which is represented as $d_{(NFA)}=\text{desc}(q_{s(NFA)}, r)$.

A set of the output descriptions in which an output alphabet p is not empty with respect to the NFA state 13, is referred to as the NFA output description set 24, being represented as $D_{(NFA)}$. For the output description $d_{(NFA)}=\text{desc}(q_{(NFA)}, r)$, $q_{(NFA)}$ is referred to as an output state; r, an output result. Furthermore, a function giving the output state of the output description d is referred to as State and a function giving the output result, as Result, and each of them is represented as $q_{(NFA)}=\text{State}(d_{(NFA)})$ and $r_{(NFA)}=\text{Result}(d_{(NFA)})$.

The description thus far completes explanations of the terms and symbols. In the next place, an operation will be described.

Figure 8:
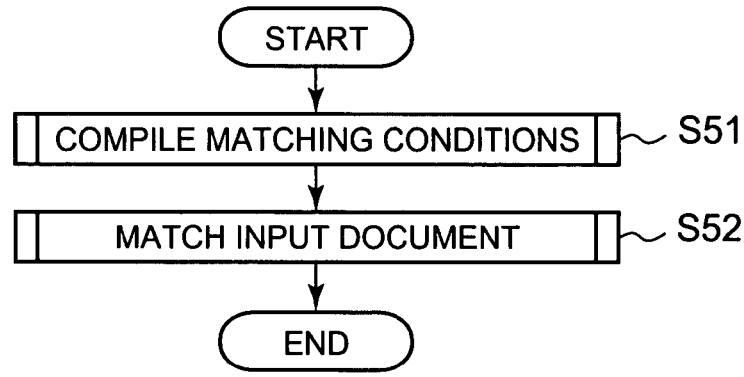
FIG. 8 is a flowchart illustrating the operation of the string matching system.

FIG. 8 shows the operation of the string matching system 1 of the present invention.

The string matching system 1 of the present invention first receives the matching conditions 2, to execute process for generating with the state transition table generator 3 the state transitions 11 and the output descriptions 12—i.e., a procedure of compiling a matching condition (Step 51).

Subsequently, the string matching system 1 receives the input document 6, and by using the input character reader 7 and the SDFA automaton 8, sequentially executes procedures for outputting the matching result 10 while making reference to the state transitions 11 and the output descriptions 12 (Step S52).

It should be noted that although in the embodiment, a procedure of "match input document" is to be performed once per procedure of "compile matching conditions," matching the input document may be performed with respect to a plurality of input documents using the state transitions 11, and the output descriptions 12, generated by the one-time procedure of "compile matching conditions."

Figure 9:
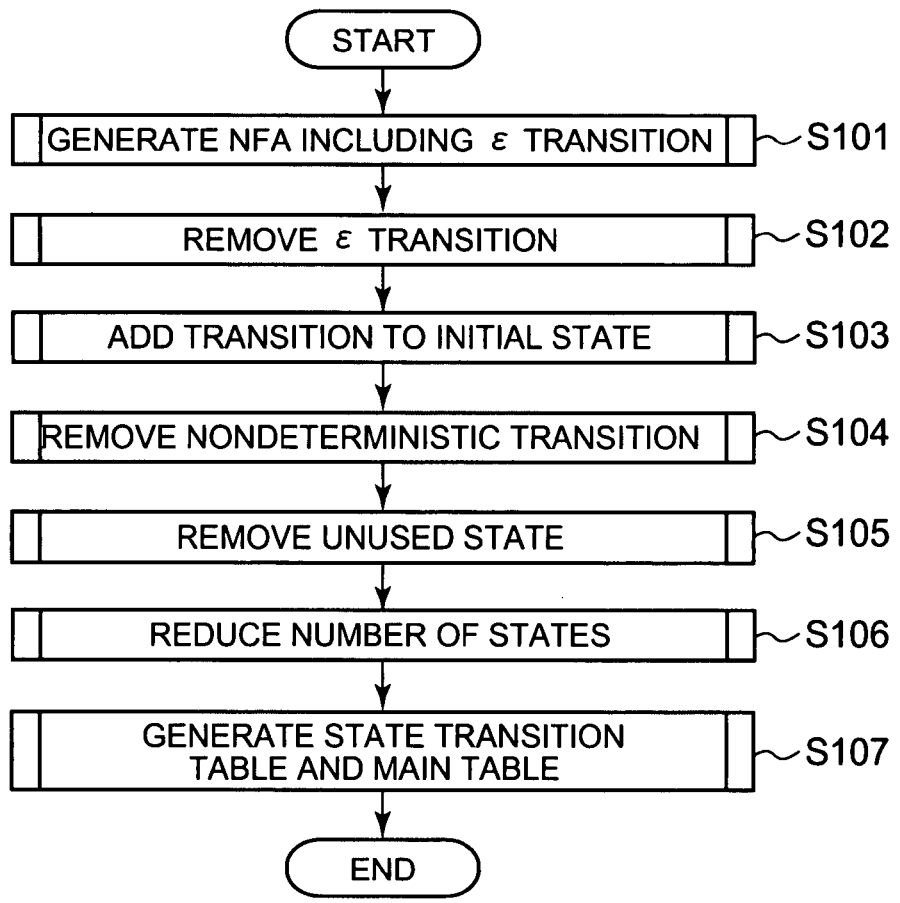
FIG. 9 is a flowchart illustrating a compile operation of the matching conditions.

Next, with reference to FIG. 9, the procedure "compile matching conditions" will be described.

To begin with, based upon a procedure of "generate NFA including ε transitions," the NFA including ε transitions are generated from a regular expression (Step S101).

Subsequently, by a procedure of "remove ε transitions" the ε transitions contained in the NFA (empty-character transition) are removed (Step S102).

Further subsequently, by a procedure of "add transition to initial state" the transition is added to the initial state during matching failure (Step S103).

Still further subsequently, by a procedure of "remove nondeterministic transition," the nondeterministic transition is removed Step S104).

Still further subsequently, by a procedure of "remove unused state," states that have been unnecessary in the procedures described thus far are eliminated (Step S105).

Still further subsequently, by a procedure of "reduce number of states," redundant states and redundant state transitions are deleted (Step S106).

Still further subsequently, by a procedure of "generate state transition table and output table," the state transition table and the output table are generated from the state set (Step S107).

The procedures described above allow the procedure "compile matching conditions" to be executed.

For the procedure of "generate NFA including ε transitions," described in Step S101, a well-known procedure indicated in Non-Patent Document 1 and the like, can be used.

Figure 24:
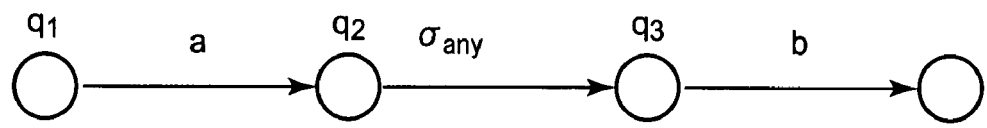
FIG. 24 is a state diagram for explaining replacement of a metacharacter "."

In this regard, however, as illustrated in FIG. 24, a metacharacter "." representing an arbitrary character contained in a regular expression is replaced with $\sigma_{any}$. Here, in FIGS. 24 through 31, a state $q_{(NFA)}$ is represented simply as q.

Figure 25:
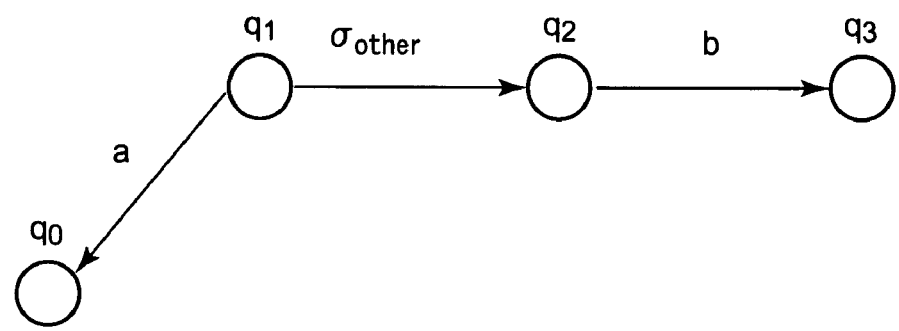
FIG. 25 is a state diagram for explaining replacement of a metacharacter "^"

Also, a procedure is added in which as illustrated in FIG. 25, a metacharacter "^" representing a character other than a particular character set, contained in the regular expression, is replaced with $\sigma_{other}$, and furthermore, a state transition from an applicable state to the initial state $q_{0(NFA)}$ is added.

The procedure of "remove ε transitions" shown in Step S102 is also implemented by replacing the ε transitions (empty-character transitions) with a transition destination set—by using a well-known procedure indicated in Non-Patent Document 1 and the like.

Figure 10:
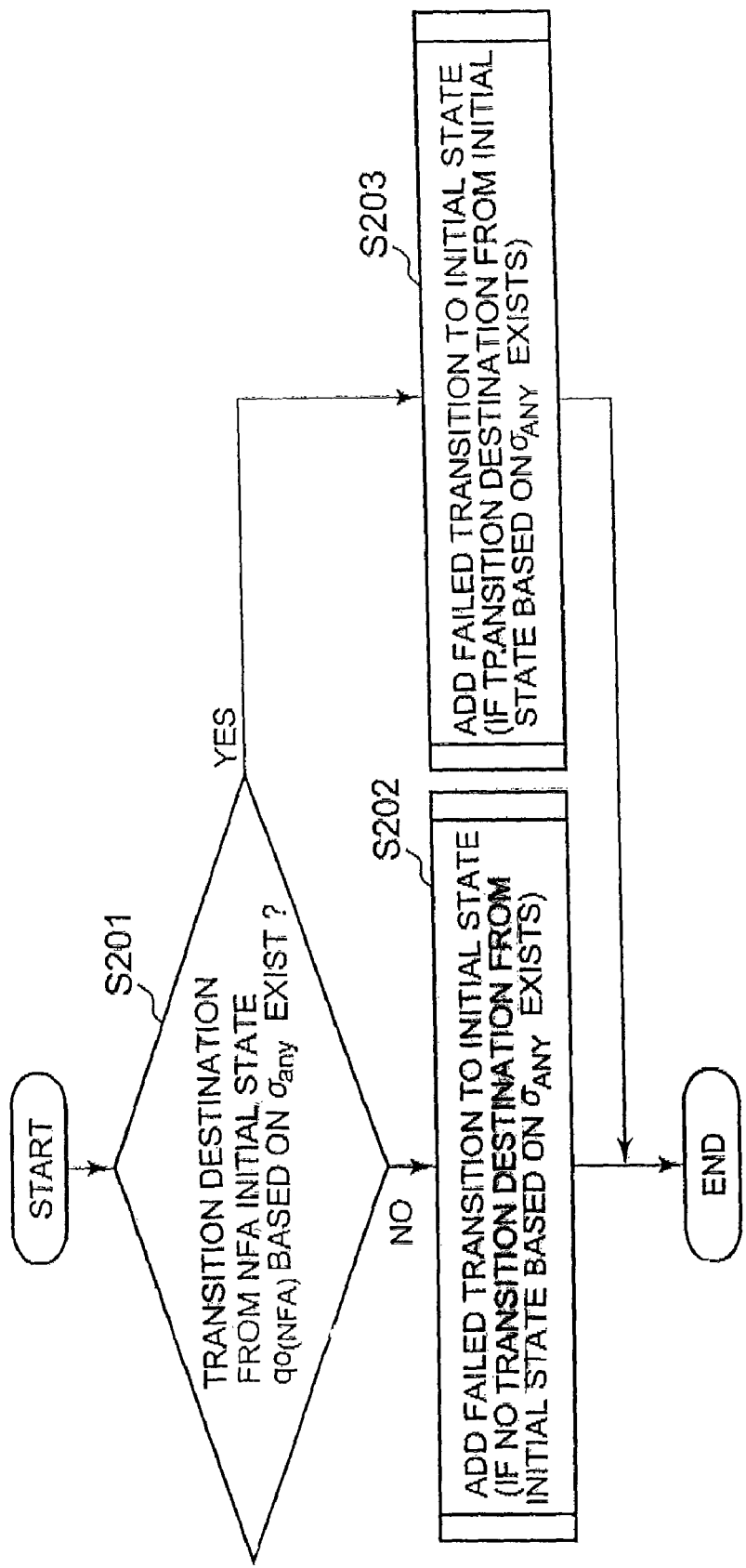
FIG. 10 is a flowchart illustrating a procedure for adding a failed transition to an initial state.

Next, referring to FIG. 10, a procedure of "add transition to initial state" in Step S103 will be described.

First, if there exists no transition based on $\sigma_{any}$, from the NFA initial state $q_{0(NFA)}$ generated by Step S102, then process flow proceeds to Step S202. In cases other than that described here, process flow proceeds to Step S203 (Step S201).

The procedure of "add failed transition to initial state (if there exists no transition from the NFA initial state based on $\sigma_{any}$)" is executed, process flow terminating (Step S202).

If, in Step S201, there exists the transition from the NFA initial state based on $\sigma_{any}$, $q_{o(NFA)}$, then the procedure of "add failed transition to initial state (if there exists the transition based on $\sigma_{any}$)" is executed, process flow terminating (Step S202).

It should be noted that although, in this embodiment, the process is determined based on whether or not there exists a transition from the NFA initial state $q_{0(NFA)}$, based on $\sigma_{any}$, the process in Step S202 can be substituted by that in Step 203. When the process in Step S202 is compared with that in Step S203, the former's applicable range is limited to a case where "there exists the transition from the initial state, based on $\sigma_{any}$," however, the former's process can further reduce the number of state transitions. The fact that a transition from the initial state based on $\sigma_{any}$ exists suggests that the head of a regular expression turning out to be matching conditions is designated with the arbitrary character ".," however, practically, there are few cases where such designation is made. For this reason, the number of state transitions can in most cases be reduced by applying the process of Step S202.

The procedures described above allow the procedure of "add failed transition to initial state" to be executed.

In the next place, the procedure of "add failed transition to initial state (if there exists no transition destination from the initial state based on $\sigma_{any}$)" in Step S202 will be described.

Figure 26:
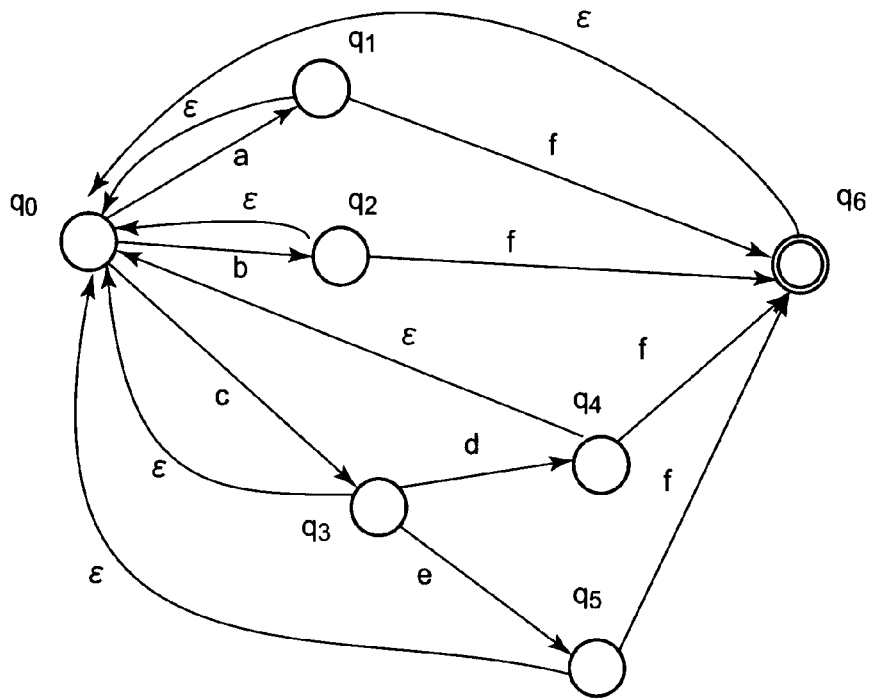
FIG. 26 is a state diagram for explaining an NFA including ∈ transitions to the initial state.
Figure 27:
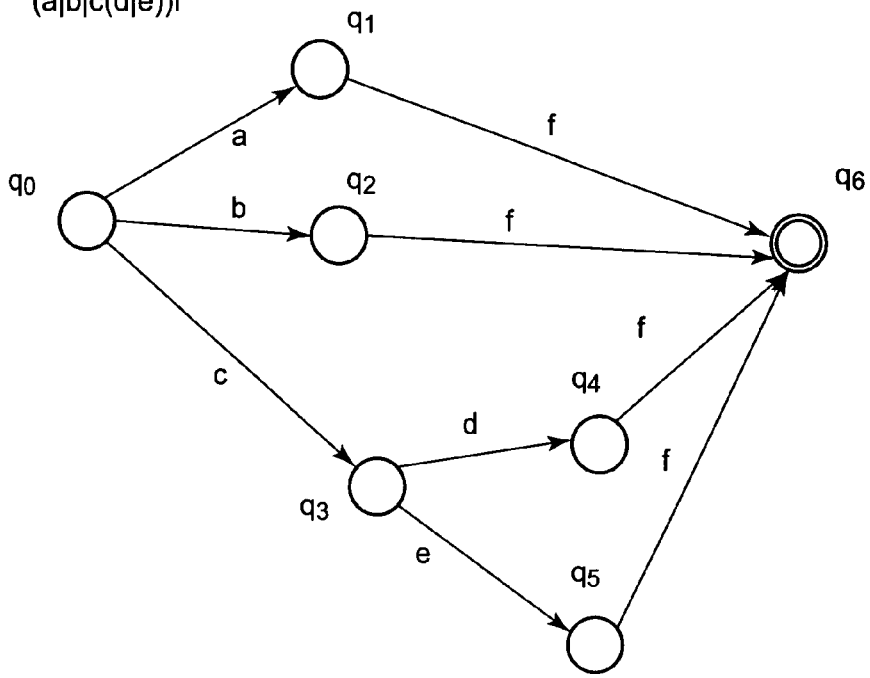
FIG. 27 is a state diagram for explaining omission of the ∈ transitions.
Figure 28:
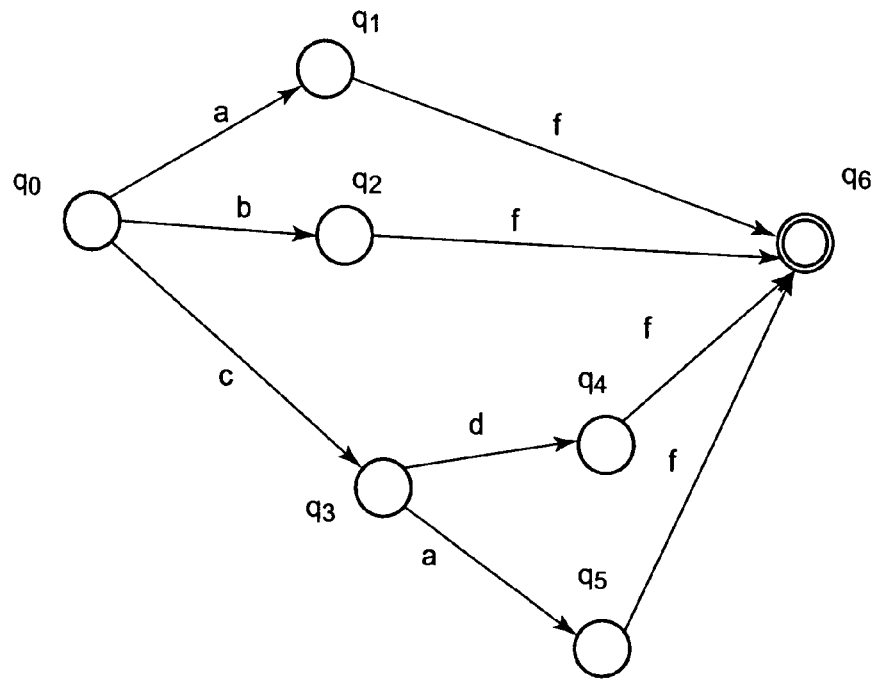
FIG. 28 is a state diagram for explaining a case where the failed transition needs to be added.
Figure 29:
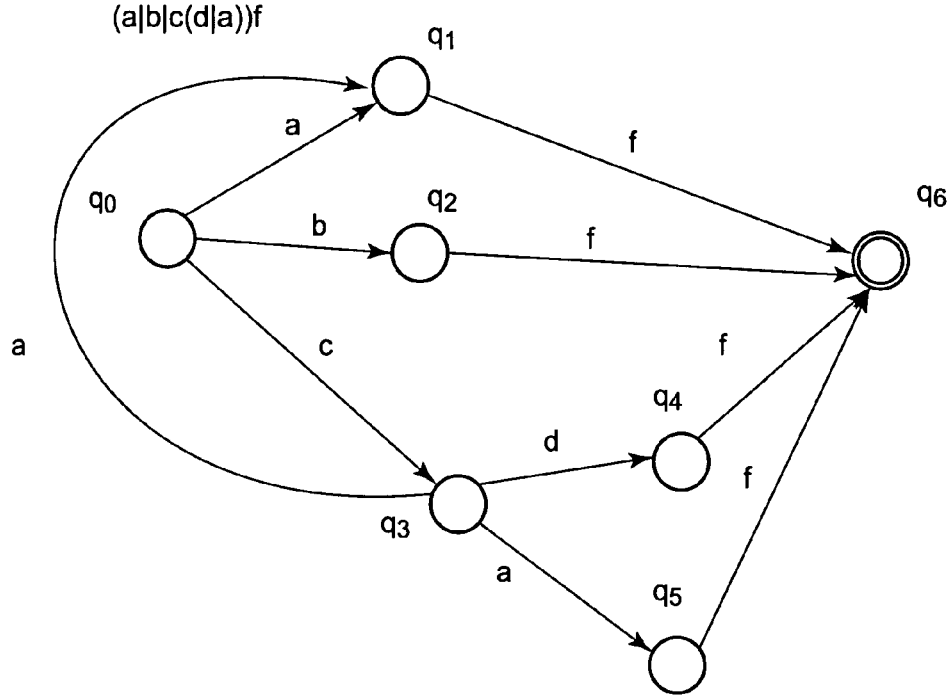
FIG. 29 is a state diagram for explaining addition of the failed transition.
Figure 30:
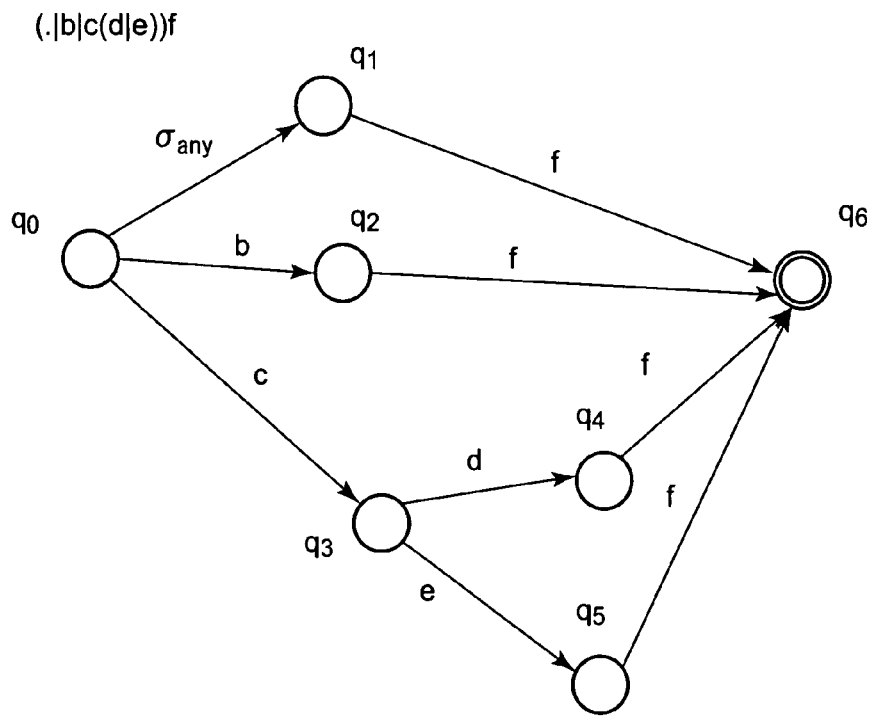
FIG. 30 is a state diagram for explaining a case where there exists a transition from the initial state based on $\sigma_{any}$.

Typically, an NFA or DFA that performs a continuous string matching can implement, by adding ε transitions from all states to the initial state, string matching from an arbitrary character position. FIG. 26 shows an example of adding the ε transitions to the NFA corresponding to a regular expression (a|b|c(d|e))f. In the SDFA automaton of the present invention, when a transition fails at a given state, the automaton returns to the initial state $q_0$ without proceeding to read input characters, and the state transition is made again, which therefor allows omission of the ε transitions to the initial state $q_0$. Namely, configuring the NFA as shown in FIG. 27 will suffice, which can extensively reduce the total number of state transitions. However, when the automation can make a transition from the initial state $q_{0(NFA)}$ to a state $q_{1(NFA)}$ based on the transition character σ, if there exists a transition from a state $q_{(NFA)}$ based on the transition character σ, or if any transition character a whose start point is the state $q_{(NFA)}$ is $\sigma_{any}$, the automaton additionally makes a transition from the state $q_{(NFA)}$ to the state $q_{1(NFA)}$ based on the transition character σ because a transition can be made to $q_{1(NFA)}$ based on the transition character a has been successful. FIG. 28 shows an example of a case of a regular expression (a|b|c(d|a))f. Because the example in FIG. 28 shows that the automaton can make a transition from the initial state $q_{0(NFA)}$ to the state $q_{1(NFA)}$ based on a transition character a, and because there exists a transition from a state $q_{3(NFA)}$ based on the transition character a, the automaton additionally make a transition from the initial state $q_{3(NFA)}$ to the state $q_{1(NFA)}$ based on the transition character a as shown in FIG. 29. Although the transition from the state $q_{3(NFA)}$ based on the transition character a turn out to be a nondeterministic state transition, the nondeterministic state transition is eventually deleted through the subsequent procedure 9 of "remove nondeterministic transition." The procedures of "add failed transition to initial state (if there exists no transition destination from the initial state based on $\sigma_{any}$)," and of "add failed transition to initial state (if there exists a transition destination from the initial state based on $\sigma_{any}$)" aim to execute this process.

Figure 11:
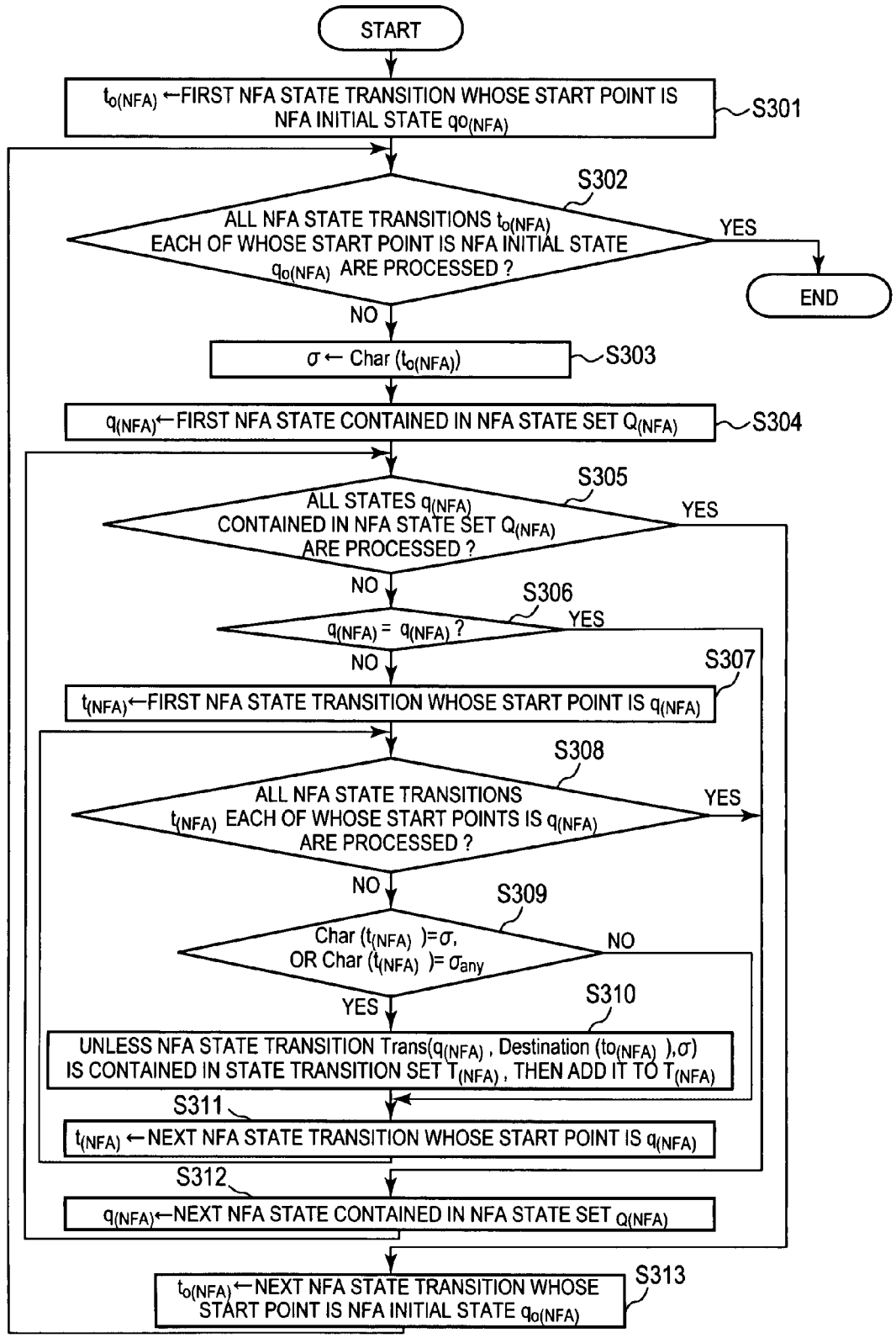
FIG. 11 is a flowchart illustrating a procedure for adding the failed transition to the initial state (if there exists no transition destination from the initial state based on $\sigma_{any}$)

With reference to FIG. 11, the procedure of "add failed transition to initial state (if there exists no transition destination from the initial state based on $\sigma_{any}$)" in Step S202 will be described.

To begin with, $t_{0(NFA)}$ is assigned as a first state transition whose start point is the initial state $q_{0(NFA)}$ of the NFA generated by Step S102, with process flow proceeding to Step S302 (Step S301).

After all the state transitions $t_{0(NFA)}$ each of whose start point is the NFA initial state $q_{0(NFA)}$ have been terminated, process flow terminates the procedures. In cases other than that described here, process flow proceeds to Step 303 (Step S302).

Symbol σ is assigned as $Char(t_{0(NFA)})$, with process flow proceeding to Step S304 (Step S303).

Symbol $q_{(NFA)}$ is assigned as the initial NFA state contained in an NFA state set $Q_{(NFA)}$, with process flow proceeding to Step S305 (Step S304).

After all of the NFA state $q_{(NFA)}$ contained in the NFA state set $Q_{(NFA)}$ have been processed, process flow proceeds to Step S313. In cases other than that described here, process flow proceeds to Step S306 (Step S305).

If the NFA state $q_{(NFA)}$ is the initial state $q_{0(NFA)}$, process flow proceeds to Step S306. In cases other than that described here, process flow proceeds to Step S307 (Step S306).

Symbol $t_{(NFA)}$ is assigned as a first NFA state transition whose start point is $q_{(NFA)}$, with process flow proceeding to Step S308 (Step S307).

After all the NFA state transitions $t_{(NFA)}$ each of whose start point is $q_{(NFA)}$ have been terminated, process flow proceeds to Step S312. In cases other than that described here, process flow proceeds to Step S309 (Step S308).

If either of the conditions—$Char(t_{0(NFA)})=\sigma$, and $Char(t_{(NFA)})=\sigma_{any}$— holds, then process flow proceeds to Step S312. If neither of the conditions holds, then, process flow proceeds to Step S311 (Step S309).

An NFA state transition $trans(q_{(NFA)}, Destination(t_{0(NFA)}), \sigma)$, unless contained in the NFA state transition set $T_{(NFA)}$, is added to T, with process flow proceeding to Step S311 (Step S310).

Symbol $t_{(NFA)}$ is assigned as the next NFA state transition whose start point is the NFA state $q_{(NFA)}$, with process flow proceeding to Step S305 (Step S311).

If, in Step S306, the NFA state $q_{(NFA)}$ is the NFA initial state $q_{0(NFA)}$, or if, in Step S308, all the NFA state transitions $t_{(NFA)}$ each of whose start point is $q_{(NFA)}$ are processed, then the NFA state $q_{(NFA)}$ is assigned as the next NFA state contained in the NFA state set $Q_{(NFA)}$ with process flow proceeding to Step S305 (Step S312).

If, in Step S305, processing all the NFA states $q_{(NFA)}$ is terminated, then $t_{0(NFA)}$ is assigned as the next NFA state transition whose start point is the NFA initial state $q_{0(NFA)}$ with process flow proceeding to Step S302 (Step S313).

The procedures described above permits execution of the procedures of "add failed transition to initial state (if there exists no transition destination from the initial state $\sigma_{any}$)."

Figure 31:
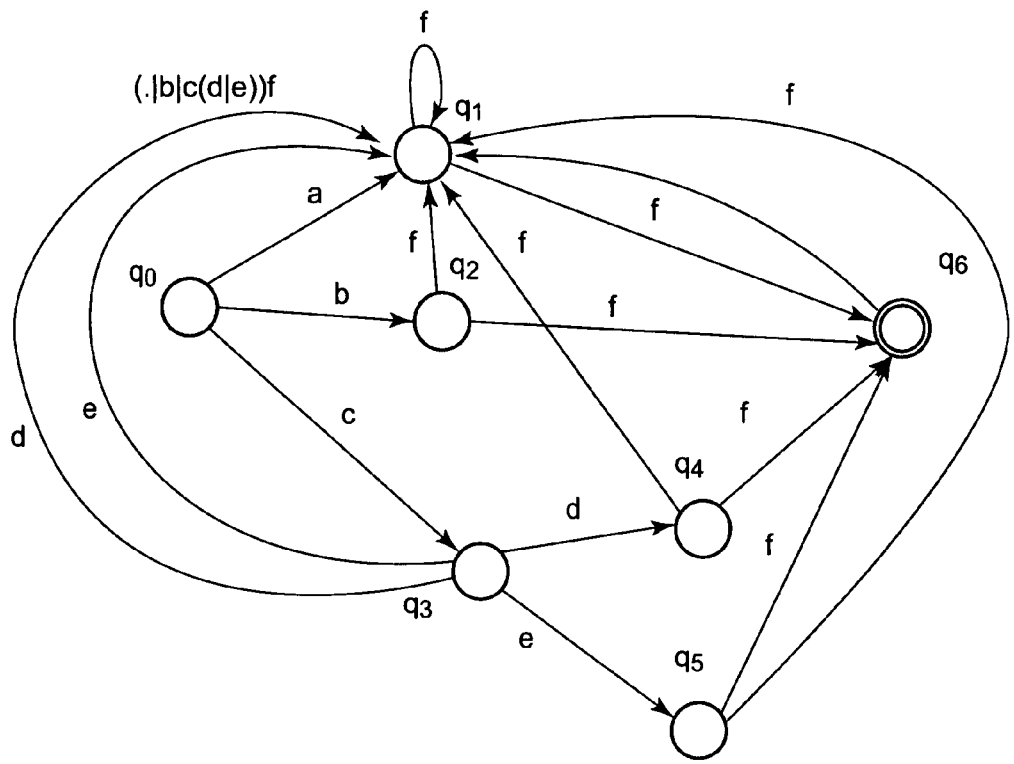
FIG. 31 is a state diagram for explaining addition of the failed transition in the case where there exists the transition to the initial state based on $\sigma_{any}$.

Next, a procedure of "add failed transition to initial state in Step S203 (if there exists a transition destination from the initial state based on $\sigma_{any}$)" will be described. An object of the procedure is the same as that in Step S202. If, as the regular expression (a|b|c(d|e))f shown in FIG. 30, there exits the transition destination $q_{1(NFA)}$ from the initial state based on $\sigma_{any}$, a transition to $q_{1(NFA)}$ can also be made even when transitions with respect to all the states are successfully made. Consequently, as shown in FIG. 31, transitions to $q_{1(NFA)}$ are added to all the NFA states $q_{(NFA)}$ except the NFA initial state $q_{0(NFA)}$ and all the transition characters σ.

Figure 12:
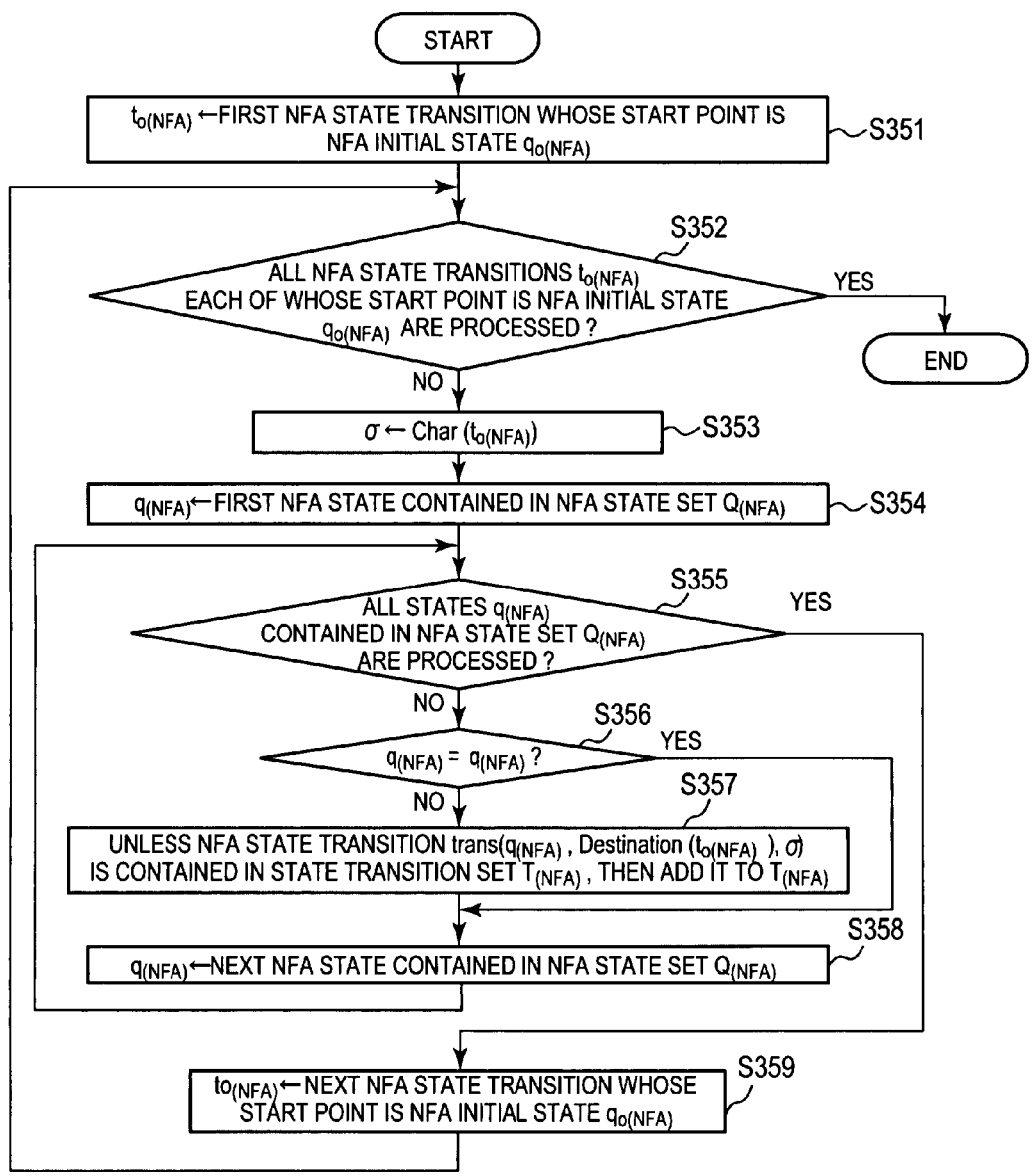
FIG. 12 is a flowchart illustrating a procedure for adding the failed transition to the initial state (if there exists a transition destination from the initial state based on $\sigma_{any}$)

With reference to FIG. 12, the procedure of "add failed transition to initial state (if there exists a transition destination from the initial state based on $\sigma_{any}$)" in Step S203 will be described.

First, $t_{0(NFA)}$ is assigned as the first NFA state transition whose start points is the initial state $q_{0(NFA)}$ of the NFA generated by Step S102, process flow then proceeding to Step S352 (Step S351).

If all the state transitions $t_{0(NFA)}$ each of whose start point is the NFA initial state $q_{0(NFA)}$ have been terminated, then process flow terminates the procedure. In cases other than that described here, process flow proceeds to Step S353 (Step S352).

Symbol σ is assigned as Char($t_{0(NFA)}$), and process flow proceeds to Step S354 (Step S353).

Symbol $q_{(NFA)}$ is assigned as the initial NFA state contained in the NFA state set $Q_{(NFA)}$, and process flow proceeds to Step S355 (Step S354).

If all the initial NFA states $q_{(NFA)}$ contained in the NFA state set $Q_{(NFA)}$ have been processed, then process flow proceeds to Step S359. In cases other than that described here, process flow proceeds to Step S356 (Step S355).

If the NFA state $q_{(NFA)}$ is the initial state $q_{0(NFA)}$, then process flow proceeds to Step S356. In cases other than that described here, process flow proceeds to Step 357 (Step S306).

The NFA state transition trans($q_{(NFA)}$, Destination($t_{0(NFA)}$), σ), unless contained in the NFA state transition set $T_{(NFA)}$, is added to T, process flow then proceeding to Step S355 (Step S358).

If, in Step S355, processing all the NFA states $q_{(NFA)}$ have been processed, then $t_{0(NFA)}$ is assigned as the next NFA state transition whose start point is the NFA initial state $q_{0(NFA)}$ with process flow proceeding to Step 352 (Step S359).

The procedure described above allows execution of the procedure of "add failed transition to the initial state (if there exists no transition destination from the initial state based on $\sigma_{any}$)."

Figure 32:
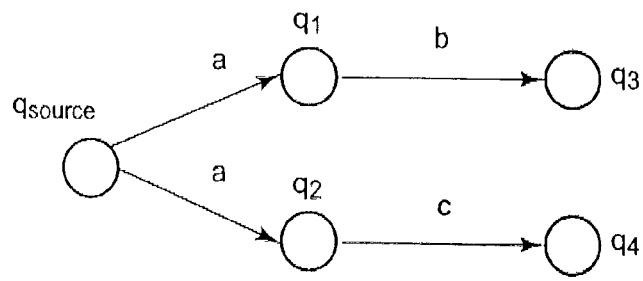
FIG. 32 is a state diagram for explaining removal of a nondereministic transition (before removal)
Figure 33:
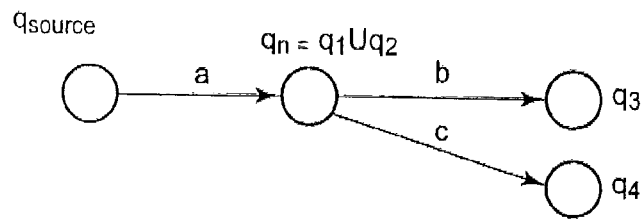
FIG. 33 is a state diagram for explaining the removal of the nondereministic transition (after removal)
Figure 34:
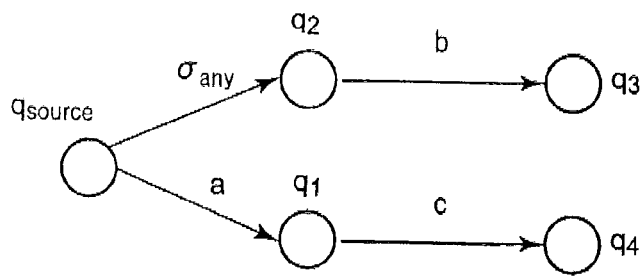
FIG. 34 is a state diagram for explaining removal of another nondereministic transition (before removal)
Figure 35:
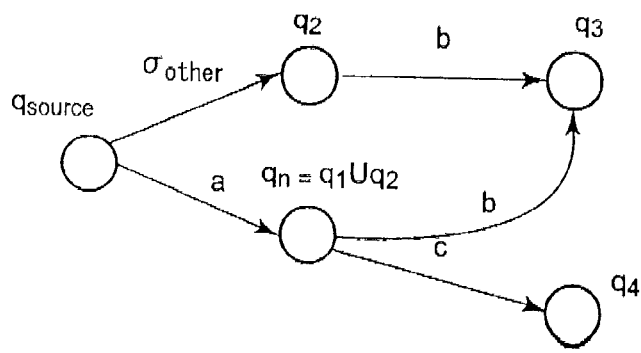
FIG. 35 is a state diagram for explaining the removal of another nondeterministic transition (after removal)

Next, a procedure of "remove nondeterministic transition" in Step S104 will be described. The procedure eliminates the nondeterministic transition contained in the NFA, to generate the deterministic transition, one of which examples is illustrated in FIG. 32. There exist $q_1$ and $q_2$ to which the automaton makes a transition from a state $q_{source}$ based on the transition character a. Namely, because of being nondeterministic, the states of transition destinations are merged into a single state; stated another way, as shown in FIG. 33, the state transition is made to a sum set $q_n = q_1 \cup q_2$ of the NFA state sets $q_1$ and $q_2$ at the transition destinations. While this procedure is basically the same as the DFA generation procedure shown in Non-Patent Document 1 and the like, in the embodiment, as shown in FIG. 34, with respect to a case including the state transition $q_2$ the arbitrary character $\sigma_{any}$, and the state transition end point $q_1$ based on the transition character a, a transition to the state $q_1$ based on the exclusion character $\sigma_{other}$ as well as a state transition to the state $q_n = q_1 \cup q_2$ associated with the nondeterministic transition character a, is further generated (FIG. 35).

Figure 13:
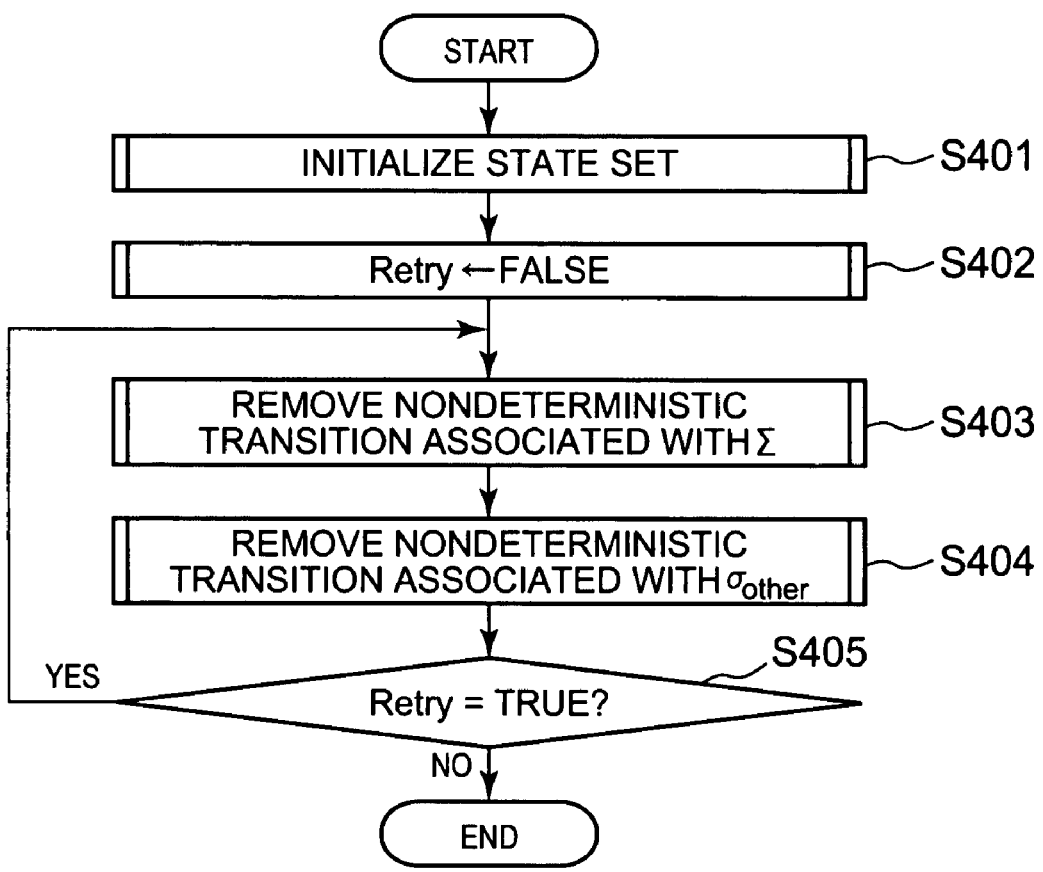
FIG. 13 is a flowchart illustrating a procedure for removing a nondeterministic transition.

With reference to FIG. 13, the procedure of "remove nondeterministic transition" in Step S104 will be described. This procedure and a procedure of "remove nondeterministic transition associated with $\sigma_{other}$" use a variable Retry. The variable Retry can take either value of TRUE or FALSE.

First, a procedure of "initialization state set" is executed, with process flow proceeding to Step S402 (Step S401).

Subsequently, the variable Retry is initialized to FALSE, and process flow proceeds to Step S401 (Step S402).

Further subsequently, a procedure of "remove nondeterministic transition associated with Σ" is performed, and process flow proceeds to Step S404 (Step S403).

Still further subsequently, a procedure of "remove nondeterministic transition associated with $\sigma_{other}$" is performed, process flow then proceeding to Step S405 (Step S404).

If the variable Retry is TRUE, then process flow proceeds to Step S403. If it is FALSE, then process flow terminates (Step S405).

The procedure described thus far allows the procedure "remove nondeterministic transition" to be executed.

Next, the procedure of "initialize state set" in Step S104 will be described. The procedure is directed to initialize a necessary state set in order to generate a DFA state, and its object is to generate a DFA state $\{q_{(NFA)}\}$ and its associated state transition, with respect to all the NFA states $q_{(NFA)}$.

Figure 14:
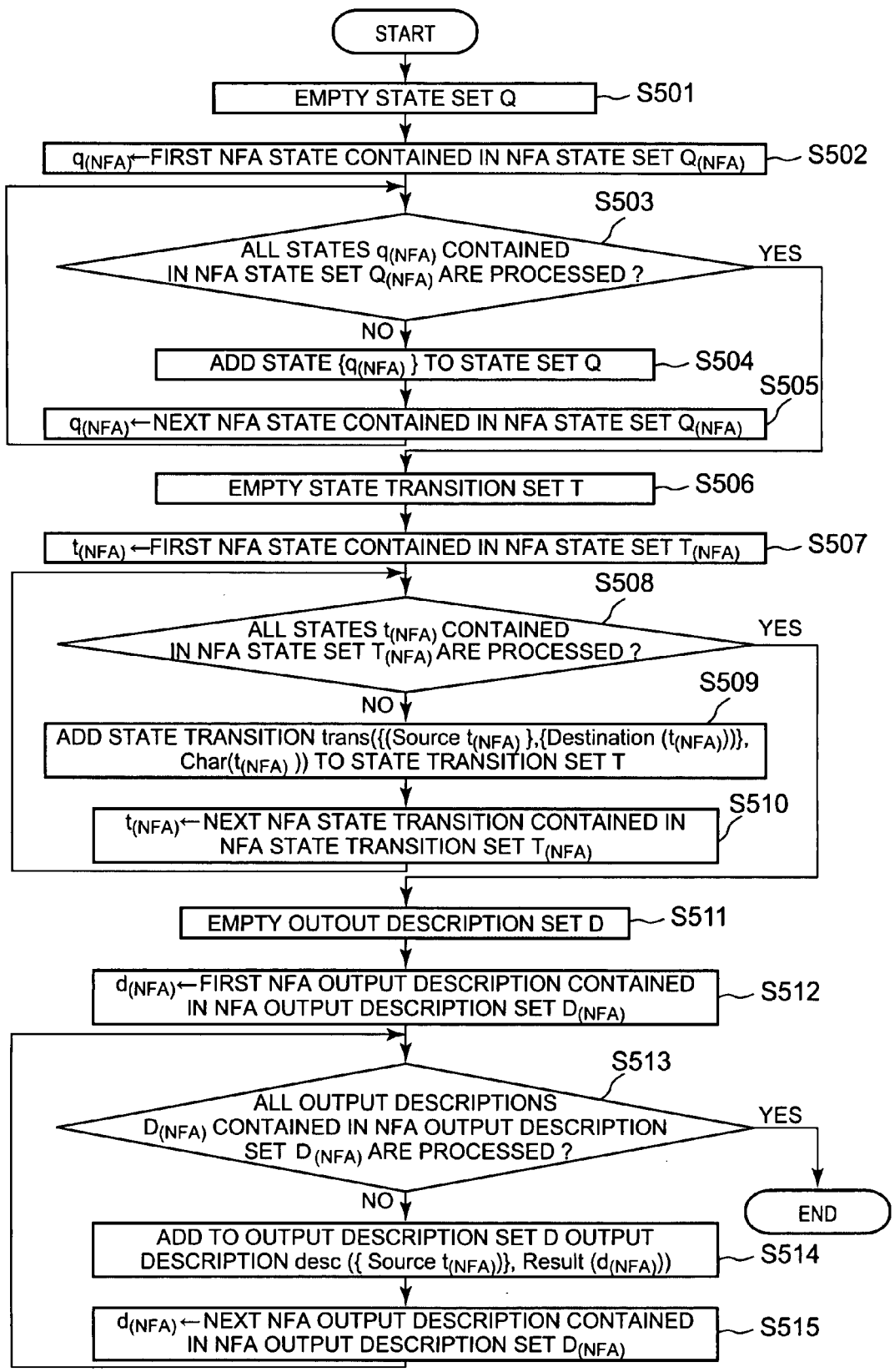
FIG. 14 is a flowchart illustrating a procedure for initializing a state set.

With reference to FIG. 14, the procedure of "initialize state set" in Step S104 will be described.

First, the state set Q is initialized to empty, with process flow proceeding to Step S502 (Step S501).

Symbol $q_{(NFA)}$ is assigned as the initial NFA state contained in an NFA state set ($Q_{(NFA)}$), with process flow proceeding to Step S502 (Step S502).

If all the initial NFA states $q_{(NFA)}$ contained in the NFA state set $Q_{(NFA)}$ are processed, then process flow proceeds to Step S506. In cases other than that described here, process flow proceeds to Step S504 (Step S503).

The NFA state set (i.e., the DFA state) $\{q_{(NFA)}\}$ is added to the state set Q, and process flow proceeds to Step S505 (Step S504).

$q_{(NFA)}$ is assigned as the next NFA state contained in the NFA state set $Q_{(NFA)}$, process flow then proceeding to Step S503 (Step S505).

If in Step S503, all the NFA states $q_{(NFA)}$ contained in the NFA state set $Q_{(NFA)}$ are processed, then process flow proceeds to Step S507 (Step S506).

Next, $t_{(NFA)}$ is assigned as a first NFA state contained in the NFA state set $T_{(NFA)}$, process flow then proceeding to Step S508 (Step S507).

If all the NFA state transitions $t_{(NFA)}$ contained in the NFA state transition set $T_{(NFA)}$ are processed, then process flow proceeds to Step S511. In cases other than that described here, process flow proceeds to Step S509 (Step S508).

After trans({Source($t_{(NFA)}$)}; {Destination($t_{(NFA)}$)}; and {Char($t_{(NFA)}$)} are added to the state transition set T, process flow proceeds to Step S510 (Step S509).

Symbol $t_{(NFA)}$ is assigned as the next NFA state contained in the NFA state set $T_{(NFA)}$, process flow proceeds to Step S508 (Step S510).

If, in Step S508, all the NFA states $t_{(NFA)}$ contained in the $T_{(NFA)}$ are processed, then an output description set D is made to be empty, with process flow proceeding to Step S512 (Step S511).

Next, $d_{(NFA)}$ is assigned as a first NFA state contained in the NFA output description set $D_{(NFA)}$, and process flow proceeds to Step S508 (Step S512).

If all the NFA output descriptions $d_{(NFA)}$ contained in the NFA output descriptions set $D_{(NFA)}$ are processed, then process flow terminates. In cases other than that described here, process flow proceeds to Step S509 (Step S513).

desc({State($d_{(NFA)}$)} and Result(($d_{(NFA)}$))) are added to the output description set D, with process flow proceeding to Step S510 (Step S514).

Symbol $d_{(NFA)}$ is assigned as the next NFA output description contained in the NFA output description set $D_{(NFA)}$, and process flow proceeds to Step S508 (Step S515).

The procedures described thus far allow the procedure "initialize state set" to be executed.

Next, the procedure of "remove nondeterministic transition associated with Σ" in Step S403 will be described. As examples shown in FIG. 32 and FIG. 34, if there exists a plurality of transition destinations with respect to one transition character $\sigma \in \Sigma$, a transition destination based on each transition character σ is uniquely determined by replacing the plurality of transition destinations with a transition [destination] to a new state, which is an object of this procedure.

Figure 15:
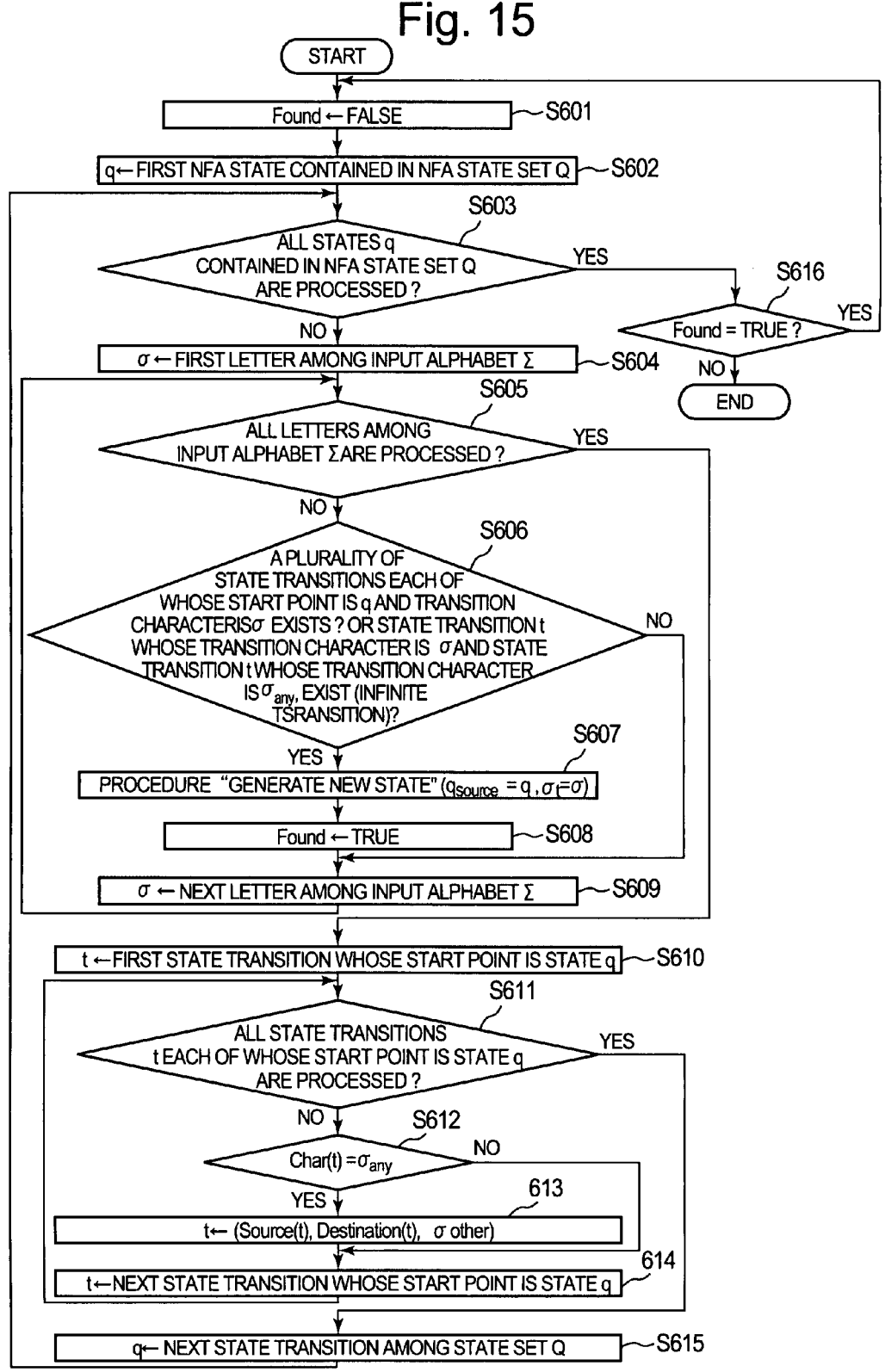
FIG. 15 is a flowchart illustrating a procedure for removing the nondeterministic transition associated with $\Sigma$.

With reference to FIG. 15, the procedure of "remove nondeterministic transition associated with Σ" in Step S403 will be described. This procedure uses a variable Found. The variable Retry can take either value of TRUE or FALSE.

In the first place, Found is initialized to FALSE, process flow then proceeding to Step S602 (Step S601).

In the next place, q is assigned as a first state transition in the state set Q, and process flow proceeds to Step S603 (Step S602).

If all the states q in the state set Q are processed, then process flow proceeds to Step S616. In cases other than that described here, process flow proceeds to Step S604 (Step S603).

Symbol σ is assigned as a first letter among the input alphabet Σ, with process flow proceeding to Step S605 (Step S604).

If all the letters σ among the input alphabet Σ are processed, then process flow proceeds to Step S610. In cases other than that described here, process flow proceeds to Step S606 (Step S605).

Given that a start point is assigned as q, if there exists a plurality of such state transitions t each of whose transition characters is σ, or if there exists a state transition t whose transition character is σ and a state transition t whose transition character is $\sigma_{any}$—i.e., if a transition based on σ is nondeterministic—then process flow proceeds to Step S607. In cases other than that described here, process flow proceeds to Step S609 (Step S606).

A parameter $q_{source}$ is assigned as q and a parameter $\sigma_t$, as σ, to execute a procedure "generate new state," process flow then proceeding to Step S608 (Step S607).

The variable Found is set to TRUE, with process flow proceeding to Step S609 (Step S608).

Symbol σ is assigned as a next letter among the input alphabet Σ, process flow proceeds to Step S605 (Step S609).

If, in Step S605, all the letters σ among the input alphabet Σ are processed, t is assigned as a first state transition whose start point is a state q, and process flow proceeds to Step S611 (Step S610).

If all the state transitions t each of whose start point is the state q are processed, then process flow proceeds to Step S615. In cases other than that described here, process flow proceeds to Step S612 (Step S611).

If the transition character Char(t) of t is $\sigma_{any}$, then process flow proceeds to Step S613. In cases other than that described here, process flow proceeds to Step S614 (Step S612).

After the transition character of t is replaced with $\sigma_{other}$—i.e., by replacing t with (Source (t), Destination (t), $\sigma_{other}$), process flow proceeds to Step S614 (Step S613).

Symbol t is assigned as the next state transition whose start point is that state q, with process flow proceeding to Step 611 (Step S614).

If, in Step S611, all the state transitions t each of whose start point is the state q are processed, then the state q is assigned as the next state transition in the state set Q, and process flow proceeds to Step S603 (Step S615).

When, in Step S603, all the states q in the state set Q are processed, if the variable Found is TRUE, then process flow proceeds to Step S601. In cases other than that described here, process flow terminates (Step S405).

The procedures described thus far allow the procedure "remove nondeterministic transition associated with Σ" to be executed.

Figure 36:
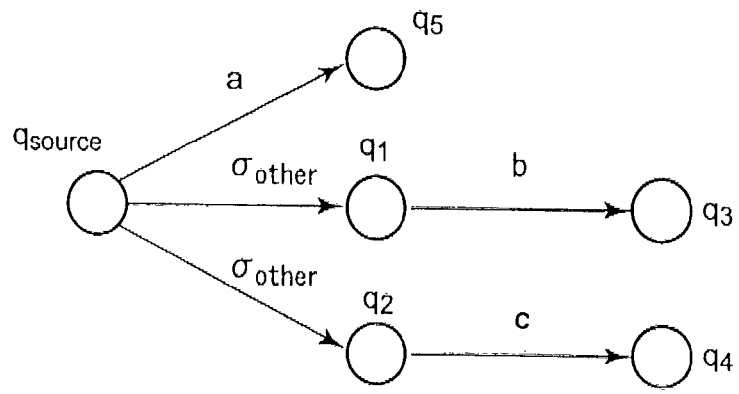
FIG. 36 is a state diagram for explaining removal of still another nondereministic transition (before removal)
Figure 37:
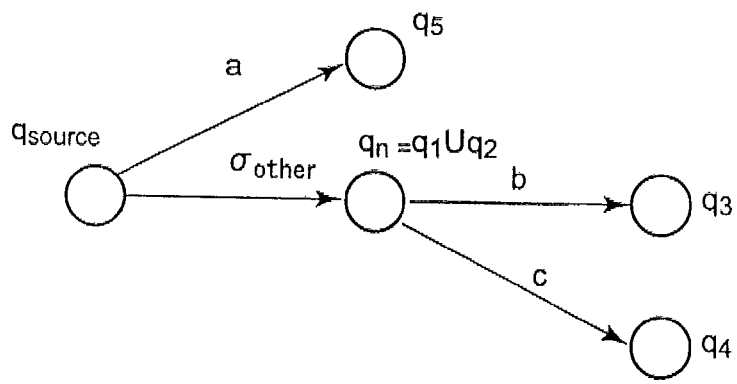
FIG. 37 is a state diagram for explaining the removal of still another nondeterministic transition (after removal)

Next, the procedure of "remove nondeterministic transition associated with $\sigma_{other}$" in Step S404 will be described. In this procedure, as shown in FIG. 36, regarding the transition based on the transition character $\sigma_{other}$ generated by "remove nondeterministic transition associated with Σ," if there exist state transitions from the state $q_{source}$ to a plurality of the states $q_1$ and $q_2$, then, as shown in FIG. 37, nondeterministic transitions based on the transition character $\sigma_{other}$ are deleted by replacing the state transitions with transitions to states of their sum set $q_n = q_1 \cup q_2$.

Figure 16:
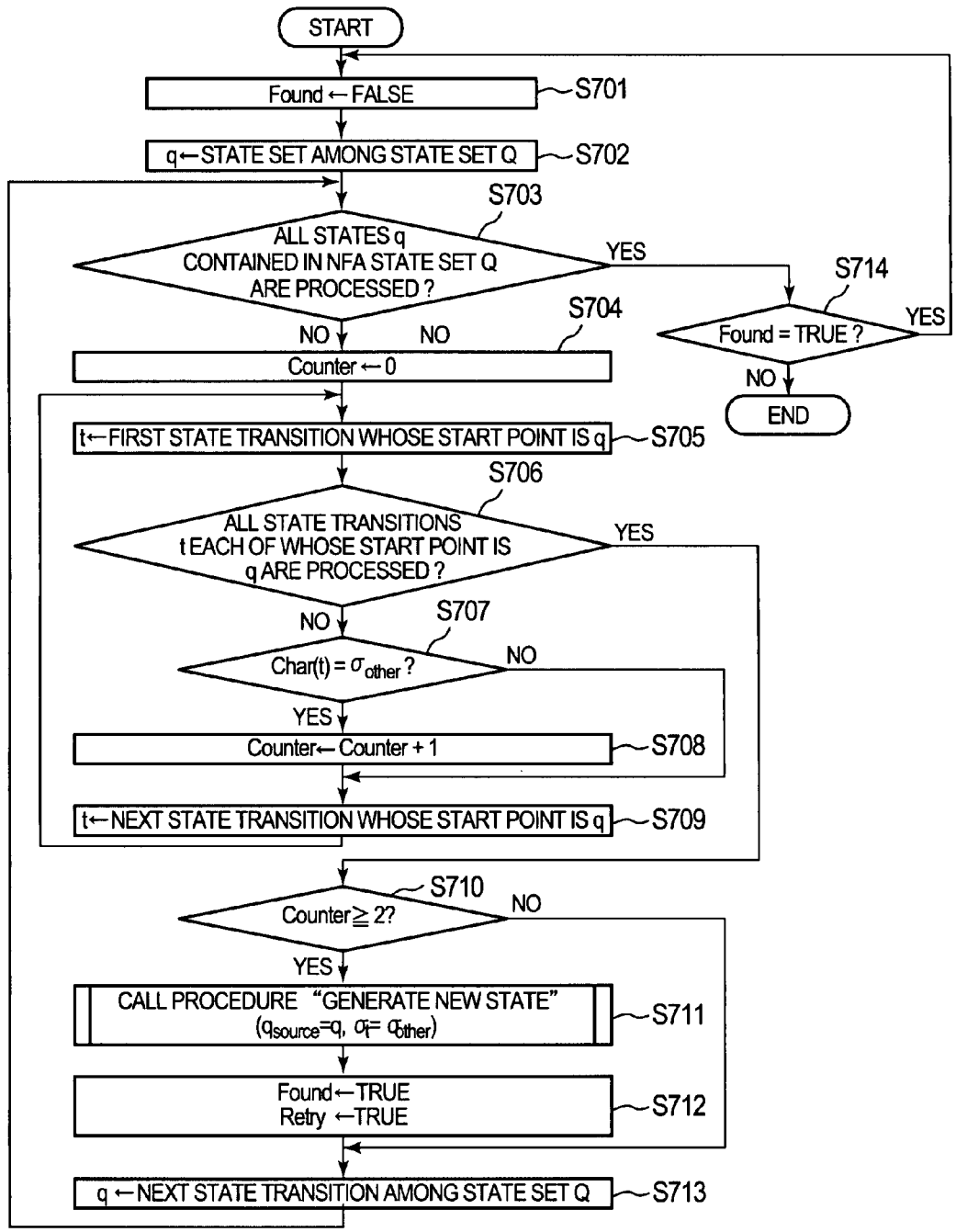
FIG. 16 is a flowchart illustrating a procedure for removing the nondeterministic transition associated with $\sigma_{other}$.

With reference to FIG. 16, the procedure of "remove nondeterministic transition associated with $\sigma_{other}$" in Step S404 will be described. This procedure uses the variable Found. The variable Found can take either value of TRUE or FALSE, and this procedure uses a variable Counter. The variable Counter can take an integer value of zero or more.

First, FALSE is assigned as the variable Found, and process flow proceeds to Step S702 (Step S701).

Symbol q is assigned as a first state in the state set Q, process flow then proceeding to Step S703 (Step S702).

If all the states q in the state set Q are processed, then process flow proceeds to Step S714. In cases other than that described here, process flow proceeds to Step S701 (Step S703).

Zero is assigned as the variable Counter, and process flow proceeds to Step S705 (Step S704).

Symbol t is assigned as a first state transition whose start point is q, and process flow proceeds to Step S706 (Step S705).

If all of the state transitions t each of whose start point is q are processed, then process flow proceeds to Step S710. In cases other than that described here, process flow proceeds to Step S707 (Step S706).

If the transition character Char(t) of t is $\sigma_{other}$, then process flow proceeds to Step S707. In cases other than that described here, process flow proceeds to Step S709 (Step S707).

One is added to the variable Counter, process flow then proceeding to Step S709 (Step S708).

Symbol t is set to the next state transition whose start point is q, with process flow proceeding to Step S705 (step S709).

If all the state transitions t each of whose start point is q are processed, then process flow proceeds to Step S710. In cases other than that described here, process flow proceeds to Step S713 (Step S710).

The parameter $q_{source}$ is set to q, and $\sigma_t$ to $\sigma_{other}$, and the procedure "generate new state" is called, process flow then proceeding to Step S712 (Step S711).

The variable Found is set to TRUE, and the variable Retry to TRUE; then process flow proceeds to Step S713 (Step S712).

Symbol q is assigned as the next transition in the state set Q, with process flow proceeding to Step S703 (Step S713).

When, in Step S703, all the states q in the state set Q are processed, if the variable Found is TRUE, then process flow proceeds to Step S701. In cases other than that described here, process flow terminates (Step S714).

The procedure described thus far allows the procedure "remove nondeterministic transition associated with $\sigma_{other}$" to be executed.

Next, the procedure of "generate new state" in Step S607 and that in Step S711 will be described. The procedure is that by which individual nondeterministic state transitions associated with the transition character $\sigma_t$ are removed from the state $q_{source}$.

Figure 17:
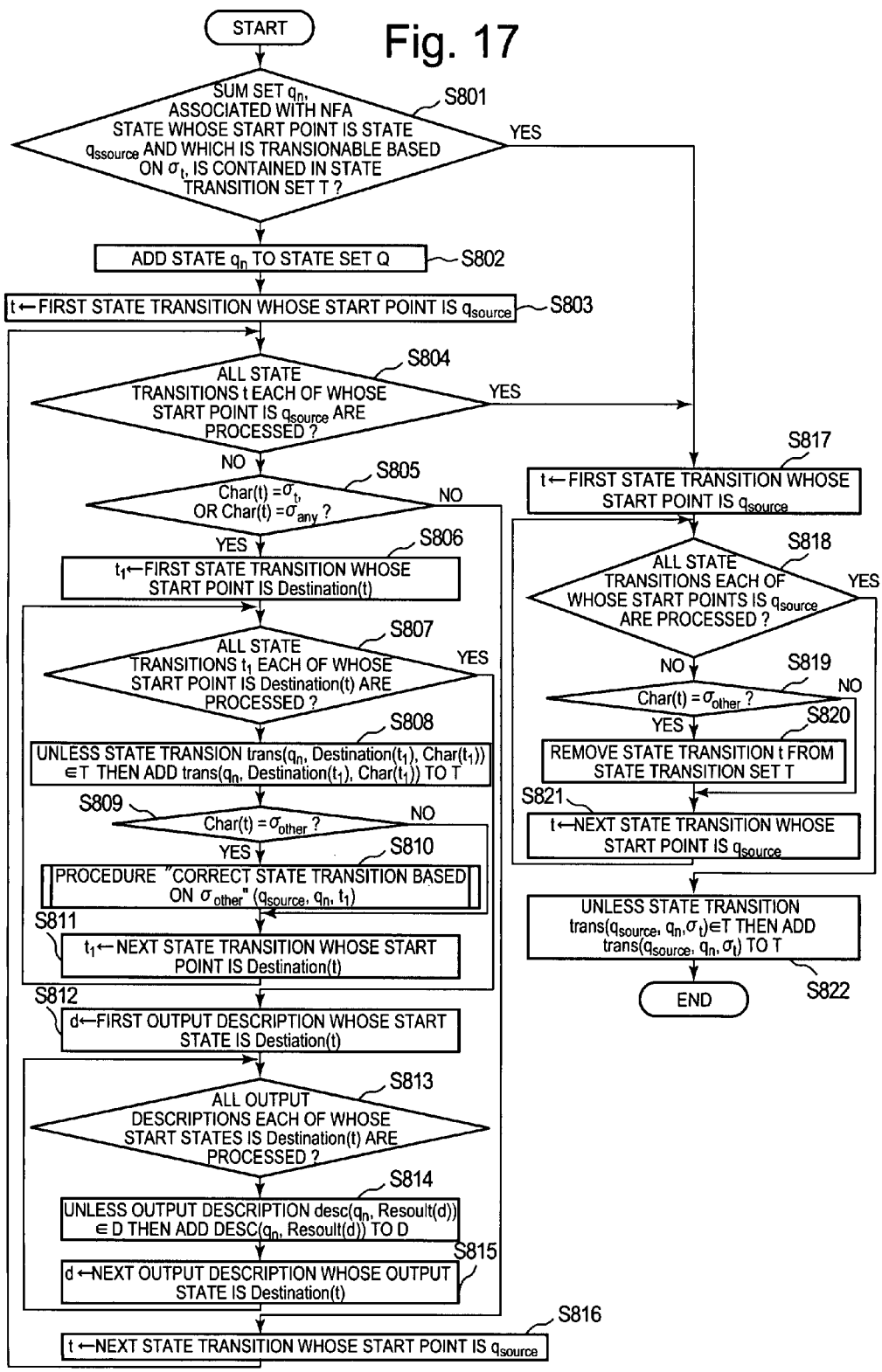
FIG. 17 is a flowchart illustrating a procedure for generating a new state.

With reference to FIG. 17, the procedures of "generate new state" in Step S607 and Step S711 will be described. In the procedure of "generate new state," $q_{source}$ and $\sigma_t$ are assigned as parameters.

First, the state $q_{source}$ is assigned as the start point, to determine a set of states that can make a transition based on $\sigma_t$, and a sum set associated with their NFA states is then determined, which sum set is assigned as a state $q_n$. If the state $q_n$ is included in the state transition set T, then process flow proceeds to Step S817. In cases other than that described here, process flow proceeds to Step S802 (Step S801).

Next, the state $q_n$ is added to the state set Q, and process flow proceeds to Step S803 (Step S802).

Symbol t is assigned as the first state transition whose start point is the state $q_{source}$, process flow then proceeding to Step 804 (Step S803).

If all the state transitions t each of whose start point is $q_{source}$ are processed, then process flow proceeds to Step S817. In cases other than that described here, process flow proceeds to Step S805 (Step S804).

If Char(t)=$\sigma_t$, or Char(t)=$\sigma_{any}$, then process flow proceeds to Step S806. In cases other than that described here, process flow proceeds to Step S816 (Step S805).

Symbol $t_1$ is assigned as the first state transition whose start point is Destination(t), process flow then proceeding to Step S807 (Step S806).

If all the state transitions $t_1$ each of whose start point is Destination(t) are processed, then process flow proceeds to Step S812. In cases other than that described here, process flow proceeds to Step S808 (Step S807).

Unless the state transition trans($q_n$, Destination($t_1$), Char ($t_1$))∈T, then the state transition trans($q_n$, Destination($t_1$), Chart($t_1$)) is added to T, process flow then proceeding to Step S809 (Step S808).

If Char($t_1$)=$\sigma_{other}$, then process flow proceeds to Step S810. In cases other than that described here, process flow proceeds to Step S811 (Step S809).

The procedure "correct state transition based on $\sigma_{other}$" is called, and process flow proceeds to Step S811, when ($q_{source}$, $q_n$, $t_1$) are given as parameters (Step S810).

Symbol $t_1$ is assigned as the next state transition whose start point is Destination(t), and process flow proceeds to Step S807 (Step S811).

If, in Step S607, all the state transitions $t_1$ each of whose start point is Destination(t) are processed, then d is assigned as the first output description whose output state is Destination(t), and process flow proceeds to Step S813 (Step S812).

If all the output descriptions d each of whose output descriptions is Destination(t) are processed, then process flow proceeds to Step S816. In cases other than that described here, process flow proceeds to Step S814 (Step S813).

Unless the output description desc($q_n$, Result(d))∈D, then desc($q_n$, Result(d)) is added to D, with process flow proceeding to Step S815 (Step S814).

Symbol d is assigned as the next output description whose output state is Destination(t), and process flow proceeds to Step 813 (Step S816).

Symbol t is assigned as the next state transition whose start point is $q_{source}$, process flow then proceeding to Step 804 (Step S816).

Unless, in Step S801, $q_n$ is contained in the state transition set T, and if, in Step S804, all of the state transitions t each of whose start point is $q_{source}$ are processed, then t is assigned as the first state transition whose start point is $q_{source}$, with process flow proceeding to Step S818 (Step S817).

If all the state transitions t each of whose start point is $q_{source}$ are processed, then process flow proceeds to Step S822. In cases other than that described here, process flow proceeds to Step S819 (Step S818).

If Char(t)=$\sigma_t$, then process flow proceeds to Step S820. In cases other than that described here, process flow proceeds to Step S821 (Step S819).

The state transition t is eliminated from the state transition set T, with process flow proceeding to Step S821 (Step S820).

Symbol t is assigned as the next state transition whose start point is $q_{source}$, and process flow proceeds to Step 818 (Step S821).

When, in Step S818, all the state transitions t each of whose start point is $q_{source}$ are processed, unless the state transition trans($q_{source}$, $q_n$, $\sigma_t$)∈T, then trans($q_{source}$, $q_n$, $\sigma_t$)∈T is added to T, process flow terminating (Step S822).

The procedure described thus far allows the procedure "generate new state" to be executed.

Figure 38:
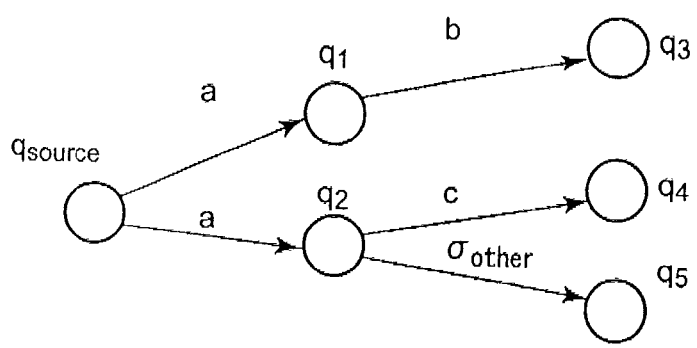
FIG. 38 is a state diagram for explaining removal of yet another nondereministic transition (before removal)
Figure 39:
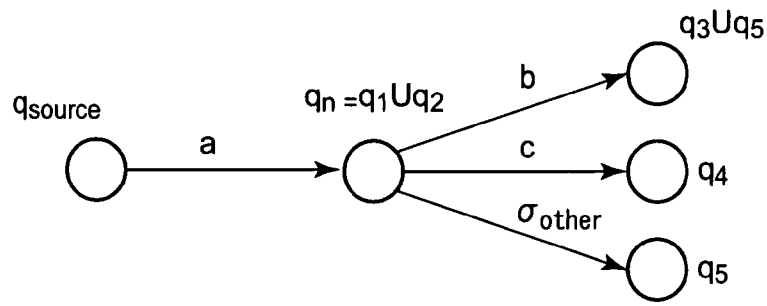
FIG. 39 is a state diagram for explaining the removal of yet another nondereministic transition (after removal)
Figure 40:
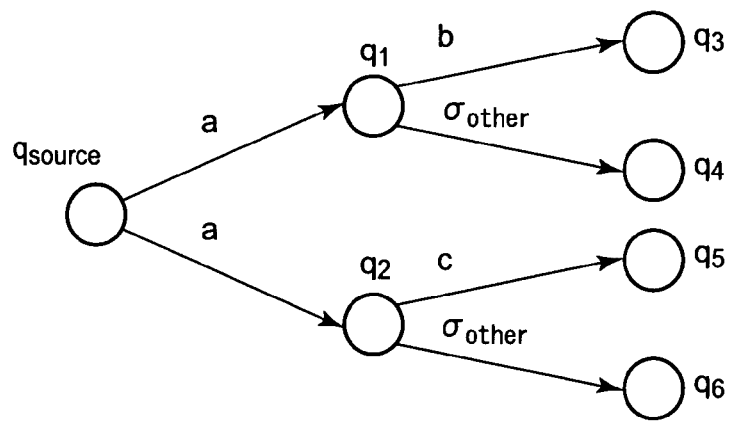
FIG. 40 is a state diagram for explaining removal of yet still another nondereministic transition (before removal)
Figure 41:
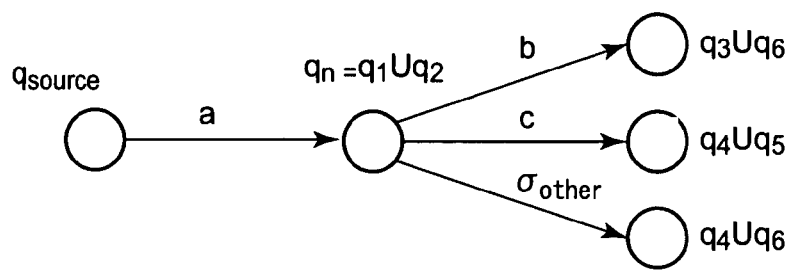
FIG. 41 is a state diagram for explaining the removal of yet still another nondereministic transition (after removal)

Next, a procedure of "correct state transition based on $\sigma_{other}$" in Step S811 will be described. The procedure shows a merging procedure of states that turn out to be end points of state transitions whose start points are states $q_1$ and $q_2$ in a case where, as illustrated in FIG. 38, state transitions based on the transition character $\sigma_{other}$ is contained in the state transition whose start point is the states $q_1$ and $q_2$ that are to be merged into a single state when nondeterministic transitions are deleted. Merging the state $q_1$ with the state $q_2$ results in a state shown in FIG. 39, and the end points based on the state $q_n$=$q_1 \cup q_2$ and the transition character b, turn out to be $q_3 \cup q_5$. In a similar fashion, merging the state $q_1$ with the state $q_2$, as shown in FIG. 41 causes the end points of the state transition based on the transition characters b, c, and $\sigma_{other}$ to turn out to be $q_3 \cup q_6$, $q_4 \cup q_5$, and $q_4 \cup q_6$, respectively.

Figure 18:
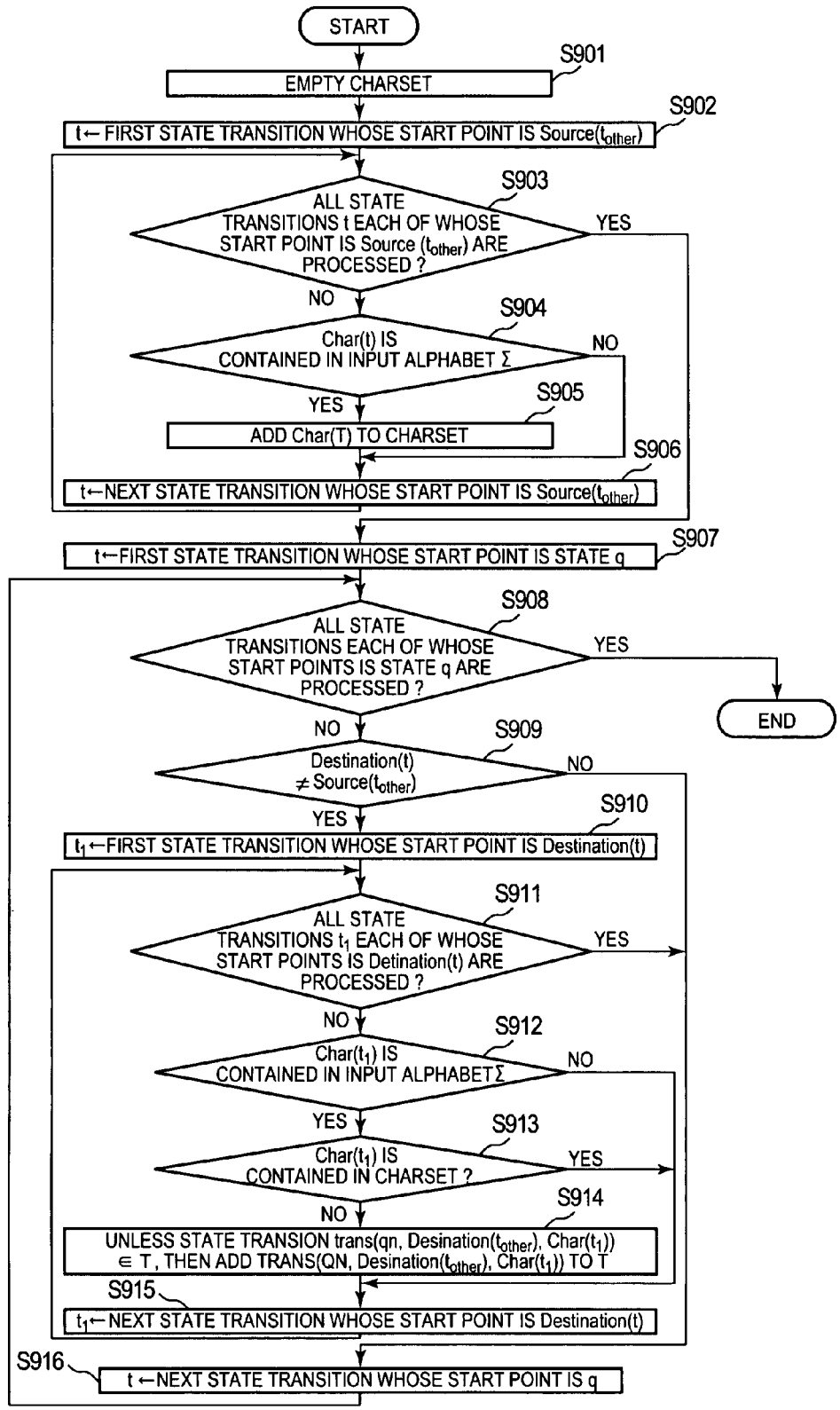
FIG. 18 is a flowchart illustrating a procedure for correcting a state transition based on $\sigma_{other}$.

With reference to FIG. 18, the procedure of "correct state transition based on $\sigma_{other}$" in Step S811 will be described. This procedure uses CharSet—a set of an extended input alphabet σ∈$\Sigma_s$.

First, CharSet is initialized to empty, with process flow proceeding to Step S902 (Step S901).

Next, t is assigned as a first state transition whose start point is Source($t_{other}$), and process flow proceeds to Step 903 (Step S902).

If all of the state transitions each of whose start point is Source($t_{other}$) are processed, then process flow proceeds to Step S907. In cases other than that described here, process flow proceeds to Step S904 (Step S903).

If Char(t) is contained in the input alphabet $\Sigma$—i.e., Char(t)$\neq\sigma_{any}$, and Char(t)$\neq\sigma_{other}$, then process flow proceeds to Step S906. In cases other than that described here, process flow proceeds to Step S905 (Step S904).

Char(t) is added to CharSet, with process flow proceeding to Step S906 (Step S905).

Symbol t is assigned as the next state transition whose start point is Source($t_{other}$), process flow then proceeding to Step 904 (Step S906).

If, in Step S903, all of the state transitions each of whose start point is Source($t_{other}$) are processed, then t is assigned as the first state transition whose start point is the state q, with process flow proceeding to Step S908 (Step S907).

If all the state transitions q each of whose start point is the state q are processed, then process flow terminates. In cases other than that described here, process flow proceeds to Step S909 (Step S908).

If Destination(t)$\neq$Source($t_{other}$), then process flow proceeds to Step S910. In cases other than that described here, process flow proceeds to Step S916 (Step S909).

Symbol $t_1$ is assigned as a first state transition whose start point is Destination(t), and process flow proceeds to Step 911 (Step S910).

If all the state transitions $t_1$ each of whose start point is Destination(t) are processed, then process flow proceeds to Step S916. In cases other than that described here, process flow proceeds to Step S912 (Step S911).

If Char($t_1$) is contained in the input alphabet $\Sigma$—i.e., Char($t_1$)$\neq\sigma_{any}$, and Char($t_1$)$\neq\sigma_{other}$, then process flow proceeds to Step S913. In cases other than that described here, process flow proceeds to Step S915 (Step S912).

If Char($t_1$) is contained in CharSet, then process flow proceeds to Step S915. In cases other than that described here, process flow proceeds to Step S914 (Step S913).

Unless the state transition trans($q_n$, Destination($t_{other}$), Char($t_1$))$\in$T, then the state transition trans($q_n$, Destination($t_{other}$), Char($t_1$)) is added to T, with process flow proceeding to Step S915 (Step S914).

Symbol $t_1$ is assigned as the first state transition whose start point is Destination(t), and process flow proceeds to Step 911 (Step S915).

Unless, in Step S909, Destination(t)$\neq$Source($t_{other}$), or if, in Step S911, all the state transitions $t_1$ each of whose start point is Destination(t) are processed, then t is assigned as the next state transition whose start point is the state q, with process flow proceeding to Step S908 (Step S916).

The procedures described above allow the procedure "correct state transition based on $\sigma_{other}$" to be executed.

Next, the procedure of "remove unused state" in Step S105 will be described. This procedure eliminates a state that has thus far been generated as a result of the process and does not turn out to be an end point of a state transition—i.e., a state in which any input has no destination to reach.

Figure 19:
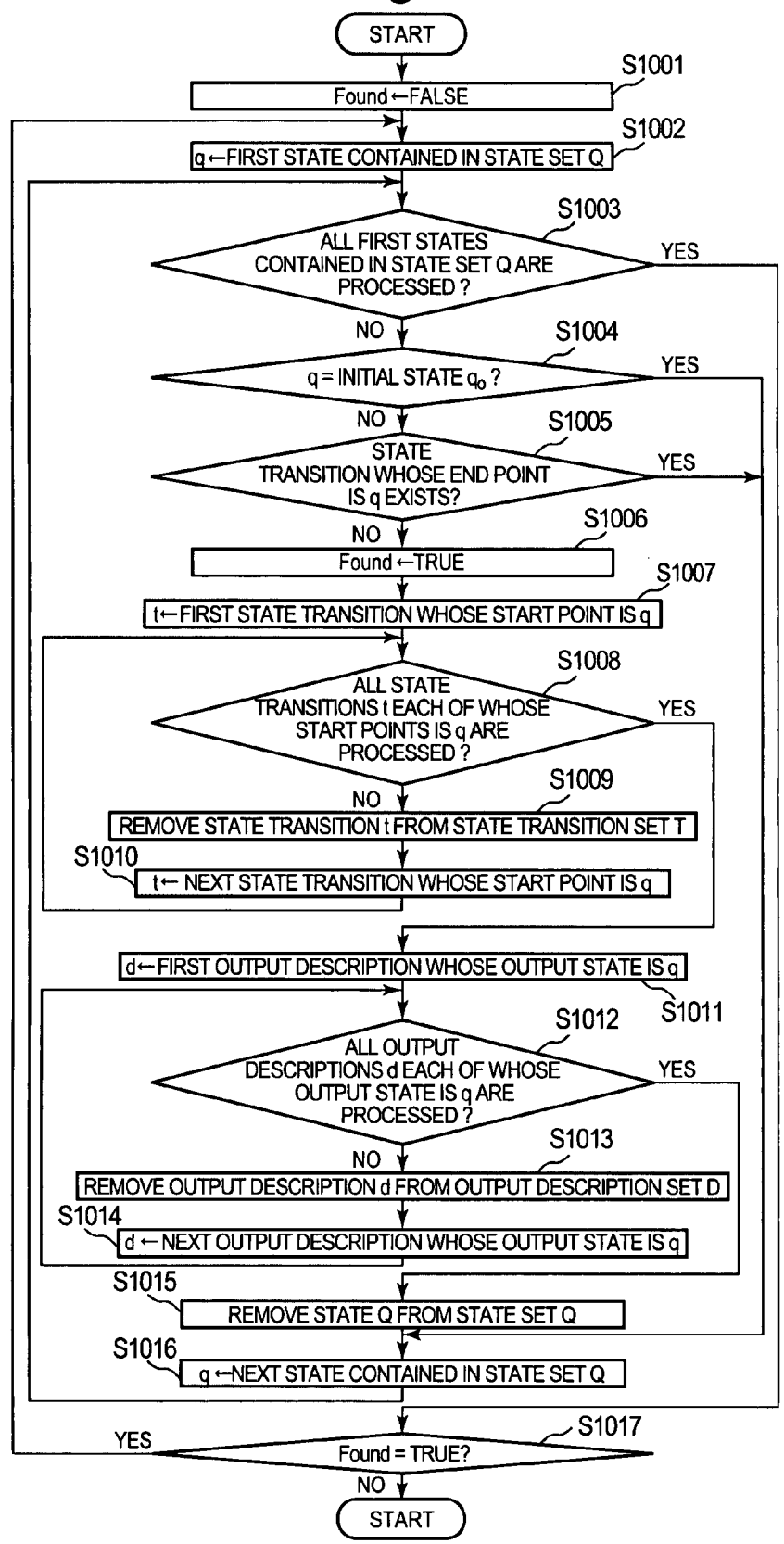
FIG. 19 is a flowchart illustrating a procedure for removing an unused state.

With reference to FIG. 19, the procedure of "remove unused state" in Step S105 will be described. This procedure uses the variable Found. The variable Found can take either value of TRUE or FALSE.

First, the variable Found is assigned as FALSE, and process flow proceeds to Step S1002 (Step S1001).

Next, q is assigned as a first state contained in the state set Q, and process flow proceeds to Step S1003 (Step S1002).

If all the states q contained in the state set Q are processed, then process flow proceeds to Step S1017. In cases other than that described here, process flow proceeds to Step S1004 (Step S1003).

If the state q is the initial state $q_0$, then process flow proceeds to Step S1016. In cases other than that described here, process flow proceeds to Step S1005 (Step S1004).

If there exists a state transition whose end point is q, then process flow proceeds to Step S1016. In cases other than that described here, process flow proceeds to Step S1006 (Step S1005).

The variable Found is set to FALSE, and process flow proceeds to Step S1007 (Step S1006).

Symbol t is assigned as a first state transition whose start point is q, and process flow proceeds to Step S1008 (Step S1007).

If all the state transitions t each of whose start point is q are processed, then process flow proceeds to Step S1011. In cases other than that described here, process flow proceeds to Step S309 (Step S308).

Such state transitions t are deleted from the state transition set T, with process flow proceeding to Step S1010 (Step S1009).

Symbol t is assigned as the next state transition whose start point is q, and process flow proceeds to Step 1008 (Step S1010).

If, in Step S1008, all the state transitions t each of whose start point is q are processed, then d is assigned as a first output description whose output state is q, with process flow proceeding to Step S1012 (Step S1012).

If all the output descriptions d each of whose output description is q are processed, then process flow proceeds to Step S1015. In cases other than that described here, process flow proceeds to Step S1013 (Step S1012).

Such output description d is removed from the output description set D, process flow then proceeding to Step S1014 (Step S1013).

Symbol d is assigned as the next output description whose output state is q, and process flow proceeds to Step S1012 (Step S1014).

If, in Step S1012, all the output descriptions d each of whose output state is q are processed, then the state q is removed from the state set Q, with process flow proceeding to Step S1012 (Step S1015).

Symbol q is assigned as the next state transition contained in the state set Q, and process flow proceeds to Step S1003 (Step S1016).

If, in Step S1003, all of the states q contained in the state set Q are processed, and if the variable Found is TRUE when Found is checked, then process flow proceeds to Step S1002. In cases other than that described here, process flow terminates (Step S1017).

The procedures described thus far allow for execution of the procedure "remove unused state."

Here, the procedure "remove unused state" is directed to reduce memory capacity needed to store a state transition table. Consequently, regardless of whether this procedure is omitted, the procedure "match input document" can be executed. Omitting the procedure permits reduction of time necessary for "compile matching conditions."

Figure 42:
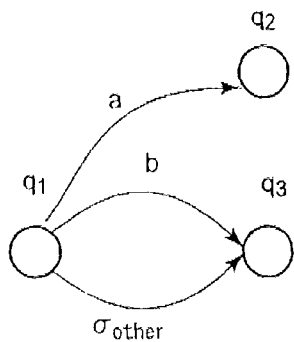
FIG. 42 is a state diagram for explaining removal of the redundant state transition.
Figure 43:
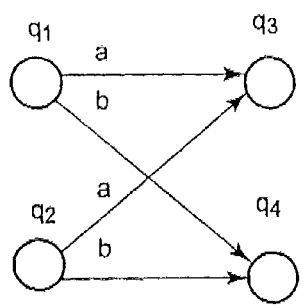
FIG. 43 is a state diagram for explaining merging of redundant states.

Next, with reference to FIG. 20, a procedure of "remove redundant state" in Step S106 will be described. The procedure removes two kinds of unnecessary states. A first case corresponds to a state transition that has the end point identical to the state transition based on $\sigma_{other}$, one of which examples is illustrated in FIG. 42. Referring to FIG. 42, regardless of whether the state transition whose end point is $q_3$ based on the transition character b, the operation of the SDFA automaton remains unchanged. Removal of this state transition allows reduction in the total number of state transitions; whereby the memory capacity needed to store the state transition table can be reduced. A second case relates to merging a plurality of states whose end points of the state transitions with respect to all the transition characters are equal to each other, one of which examples is illustrated in FIG. 43. Referring to FIG. 43, because the states $q_1$ and $q_2$ have the same end points of their state transitions with respect to all the transition characters, the states $q_1$ and $q_2$ can be replaced with $q_n = q_1 \cup q_2$ into which the states $q_1$ and $q_2$ are merged. Because one of the two cases deletes a state or a state transition, whereby the other may in some situations be capable of removing a state or a state transition, the two cases repeat until no further state and state transition is deleted.

Figure 20:
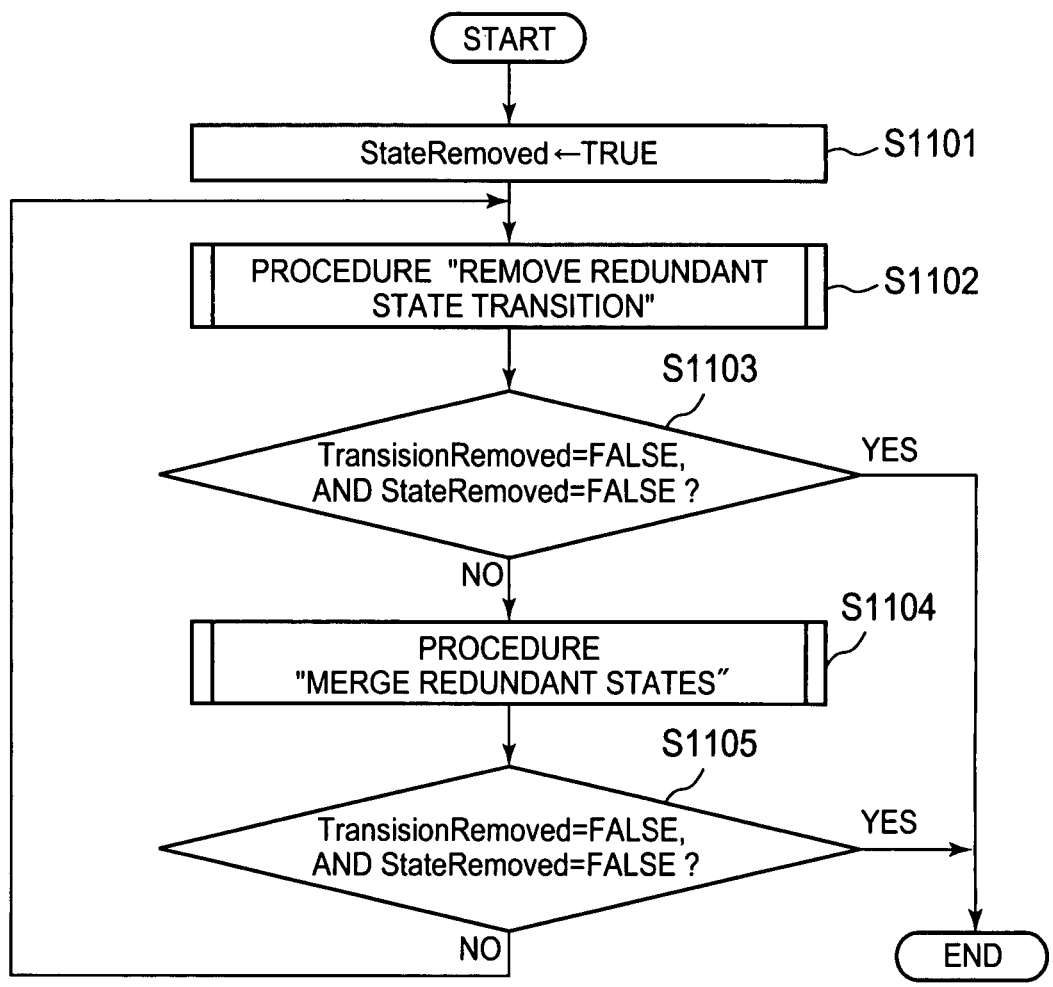
FIG. 20 is a flowchart illustrating a procedure for removing a redundant state.

With reference to FIG. 20, the procedure of "remove redundant states" in Step S106 will be described. The procedure uses variables StateRemoved and TransitionRemoved. The variables StateRemoved and TransitionRemoved can take either value of TRUE or FALSE.

In the first place, StateRemoved is set to TRUE, with process flow proceeding to Step S1102 (Step S1101).

A procedure of "remove redundant state transition" is called, and process flow proceeds to Step S1103, during which procedure TransitionRemoved is set (Step S 1102).

If TransitionRemoved=FALSE, and StateRemoved=TRUE, process flow terminates. In cases other than that described here, process flow proceeds to Step S1104 (Step S1103).

The procedure "merge redundant states" is called, process flow proceeds to Step S1105 (Step S1104).

If TransitionRemoved=FALSE, and StateRemoved=TRUE, process flow terminates. In cases other than that described here, process flow proceeds to Step S1102 (Step S1105).

The procedure described thus far allows the procedure "remove redundant states" to be executed.

Here, the procedure "remove redundant states" is directed to reduce memory capacity needed to store the state transition table. Consequently, regardless of whether this procedure is omitted, the procedure "match input document" can be executed. Omitting the procedure allows reduction in time required for "compile matching condition."

Next, the procedure of "remove redundant state transition" in Step S1102 will be described. The procedure, which corresponds to the first case of "remove redundant states," removes a state transition having the same end point state as that of a state transition based on $\sigma_{other}$, as shown in FIG. 42.

Figure 21:
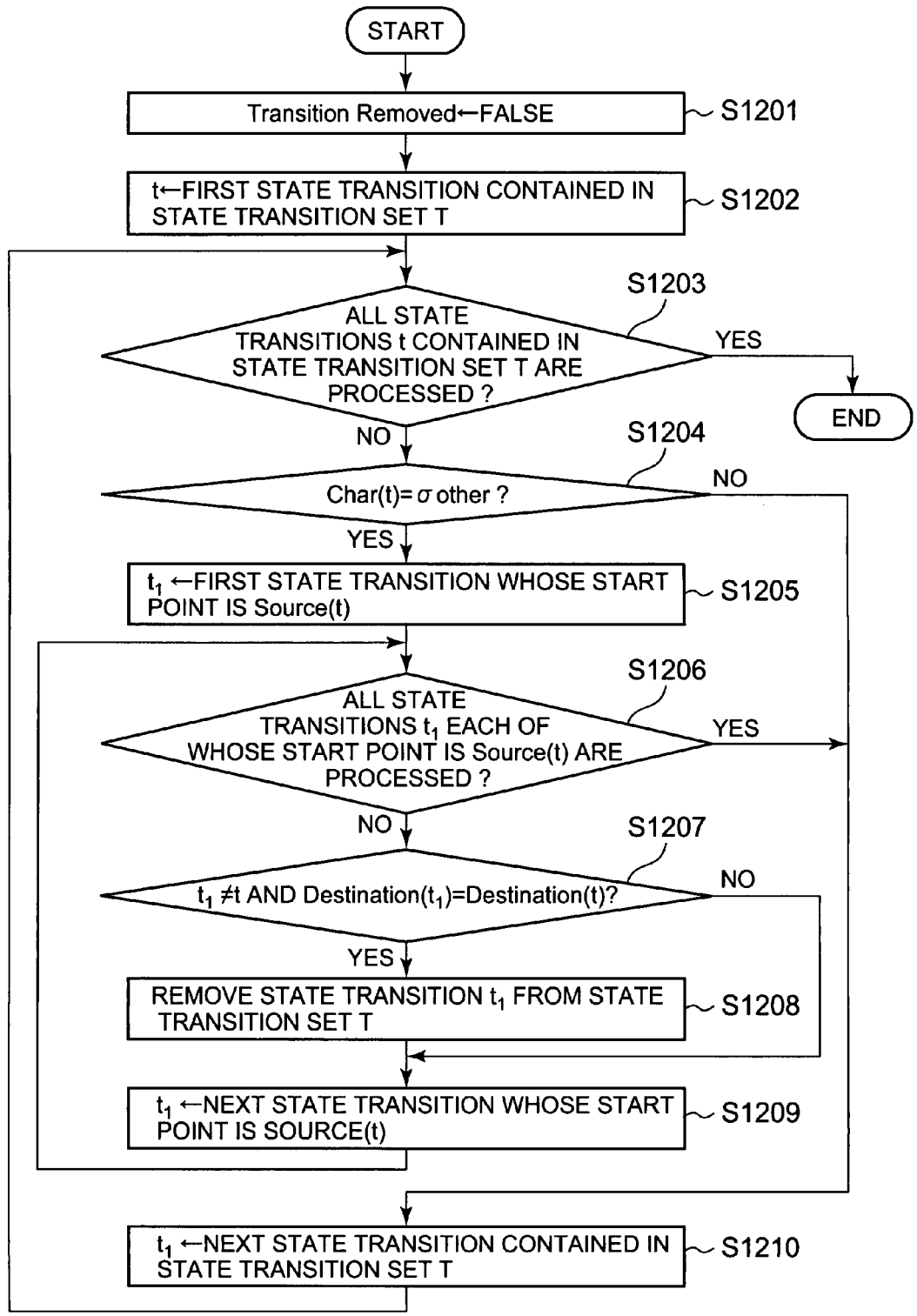
FIG. 21 is a flowchart illustrating a procedure for removing a redundant state transition.

With reference to FIG. 21, the procedure of "remove redundant state transition" in Step S1102 will be described.

The variable TransitionRemoved is first set to FALSE, with process flow proceeding to Step S1202 (Step S1201).

Next, t is assigned as the first state transition contained in the state transition set T, process flow then proceeding to Step S1203 (Step S1202).

If all the state transitions t contained in the state transition set T are processed, the process flow terminates. In cases other than that described here, process flow proceeds to Step S1204 (Step S1203).

If Char(t) is $\sigma_{other}$, then process flow proceeds to Step 1205. In cases other than that described here, process flow proceeds to Step S1210 (Step S104).

Next, $t_1$ is assigned as the first state transition whose start point is Source(t), with process flow proceeding to Step 1206 (Step S1205).

If all the state transitions $t_1$ each of whose start point is Source(t) are processed, then process flow proceeds to Step S1210. In cases other than that described here, process flow proceeds to Step S1207 (Step S1206).

If $t_1 \neq t$, and Destination(t)=Destination($t_1$), then process flow proceeds to Step S1208. In cases other than that described here, process flow proceeds to Step S1209 (Step S1207).

The state transition t is eliminated from the state transition set T, and process flow proceeds to Step S1209 (Step S1208).

Symbol $t_1$ is assigned as the next state transition whose start point is Source(t), process flow then proceeding to Step 1206 (Step S1209).

Unless, in Step S1204, Chart(t) is $\sigma_{other}$, or if, in Step S1206, all the state transitions $t_1$ each of whose start point is Source(t) are processed, then t is assigned as the next state transition contained in the state transition set T, with process flow proceeding to Step S1203 (Step S1210).

The procedure described thus far allows the procedure "remove redundant state transition" to be executed.

Next, a procedure of "merge redundant states" in Step S1104 will be described. In the second case of "remove redundant states"—that is, as illustrated in FIG. 43—this procedure merges a plurality of states together in which the end points of the state transitions for all transition characters are equal to each other.

The procedure "merge redundant states" in Step S1104 is executable through well-known procedures set forth in, e.g., Non-Patent Document 1 and the like. When this procedure merges one or more states together, the variable StateRemoved is assigned as TRUE. In cases other than that described here, the variable StateRemoved is assigned as FALSE.

Figure 22:
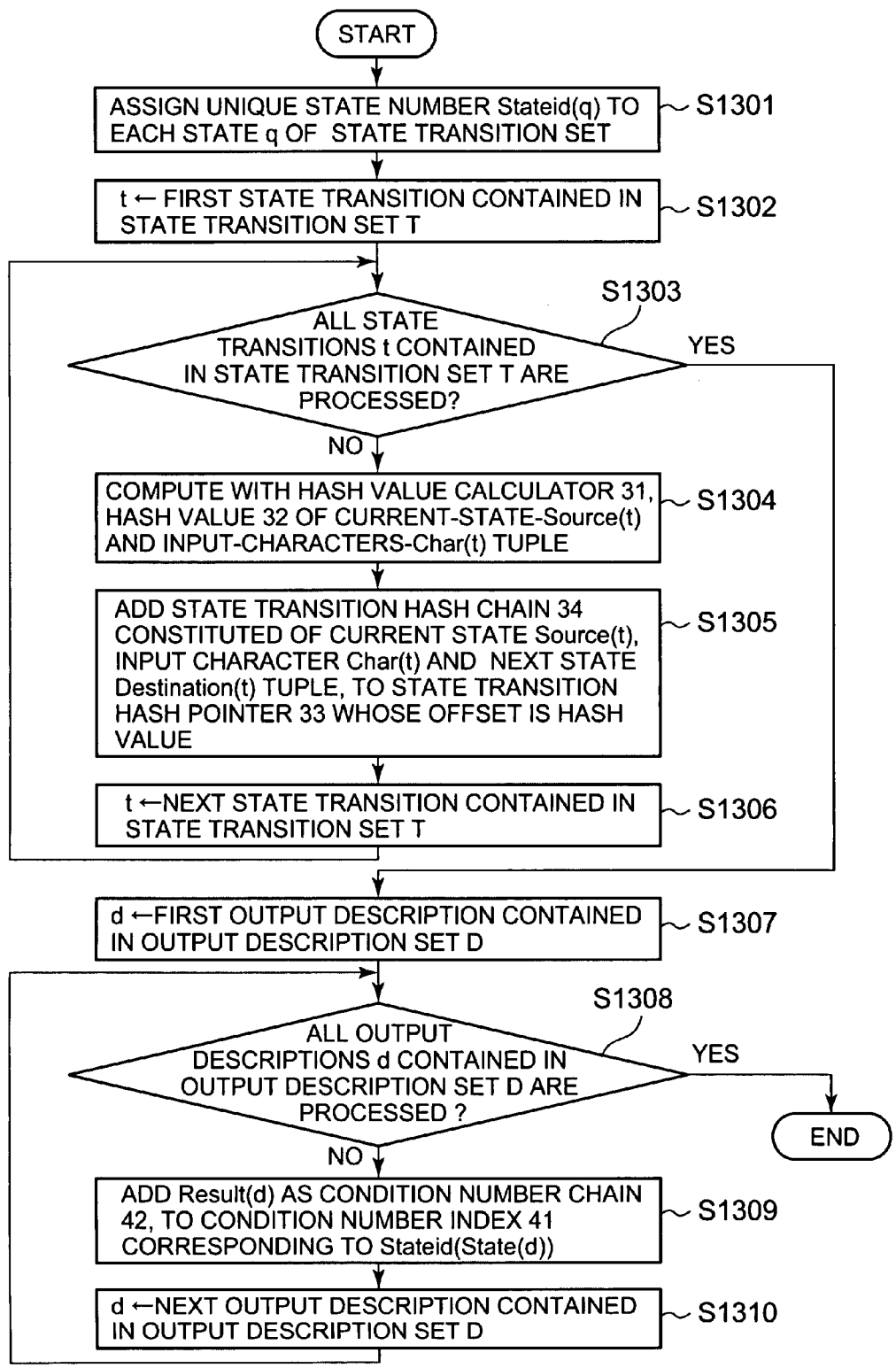
FIG. 22 is a flowchart illustrating a procedure for generating a state transition table and an output table.

Next, with reference to FIG. 22, a procedure of "generate state transition table and output table" in Step S107 will be described. The procedure extracts the state transitions 11 and the output descriptions 12 from the state set 25, the state transition set 26 and the output description set 27, to store the transitions 11 and the descriptions 12 into the state transition table storage 4 and the output table storage 12, respectively.

First, when the total number of states contained in the state set Q is assigned as N, each of the states is assigned as an unique state number StateId(q) of zero through N−1 (Step S1301).

A first state transition t is extracted from the state transition set T (Step S1302).

If all the state transitions t contained in the state transition set T are processed, then process flow proceeds to Step S1307. In cases other than that described here, process flow proceeds to Step S1304 (Step S1303).

With respect to a current-state-Source(t) and input-character-Char(t) tuple, the hash value calculator 31 computes the hash value 32, with process flow proceeding to Step S1305 (Step S1304).

The state transition hash chain 34 is constituted of a current-state-Source(t), input-character-Char(t) and next-state-Destination(t) tuple, is added to the state transition hash pointer 33 whose offset is the hash vale 32, and process flow proceeds to Step S1306 (Step S1305).

t is assigned as the next state transition contained in the state transition set T, process flow then proceeding to Step S1303 (Step S1306).

If, in Step S1303, all of the states transitions contained in the state transition set T are processed, a first output description d is extracted from the output description set (Step S1307).

If all the output descriptions d contained in the output description set D are processed, process flow terminates. In cases other than that described here, process flow proceeds to Step S130 (Step S1308).

Result(d) is added as the condition number chain 42 to the condition number index 41 corresponding to the state number StateId(State(d)) of State(d), with process flow proceeding to Step S1310 (Step S1309).

Symbol d is assigned as the next output description contained in the output description D, process flow then proceeding to Step S1308 (Step S1310).

The procedures described thus far allow the procedure "generate state transition table and output table" to be executed.

Figure 23:
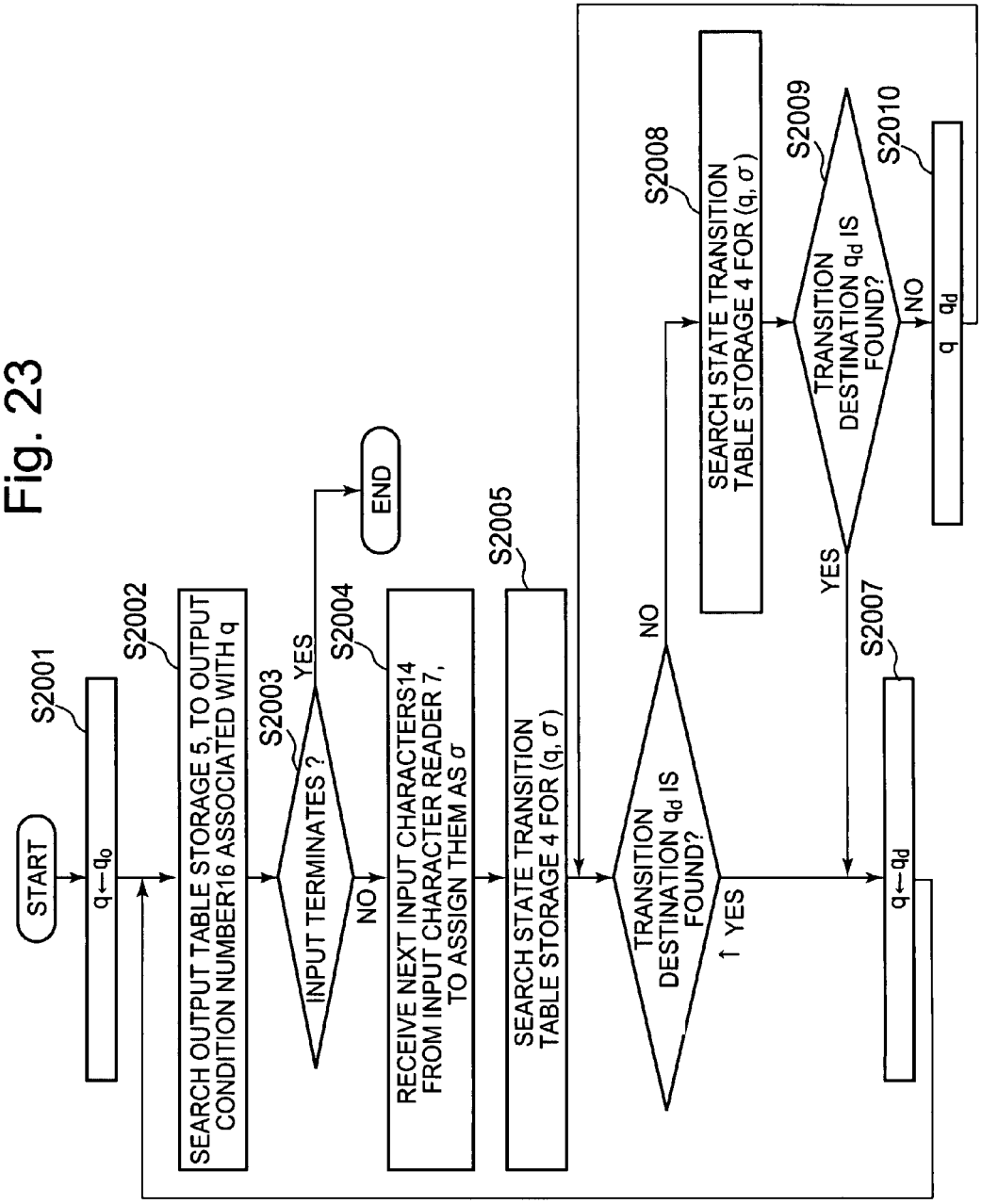
FIG. 23 is a flowchart illustrating a procedure for matching an input document.

Subsequently, with reference to FIG. 23, the procedure of "match input document" will be described.

First, the initial state $q_0$ is set to the state q, and process flow proceeds to Step S2002 (Step S2001).

The output table storage 5 is searched to output a condition number 16 associated with q. This procedure is implemented by sequentially searching for pointers to the condition number chain 42 corresponding to the state number StateID(q) of the current state 13 of the condition number index 41. If all the condition number chains 42 have been searched, then process flow proceeds to Step S2003.

Upon completion of all input, process flow terminates. In cases other than that described here, process flow proceeds to Step S2004 (Step S2003).

The next input character 14 is received from the input character reader 7, and the character 14 is assigned as σ, with process flow proceeding to Step S2005 (Step S2004).

The state transition table storage 4 is searched to check whether or not there exists a transition destination $q_d$ from the state q based on the transition character σ—i.e., whether there exists trans(q, $q_d$, σ)∈T—and process flow proceeds to Step S2006 (Step S2005).

If there exists the transition destination $q_d$, then process flow proceeds to Step S2007. In cases other than that described here, process flow proceeds to Step S2008 (Step S2007).

Symbol $q_d$ is assigned as q, and process flow proceeds to Step S2002 (Step S2007).

If there exists no transition destination $q_d$ in Step S2006, whether or not $q_d$ exists—i.e., whether there exists $q_d$ which is trans(q, $q_d$, $σ_{other}$)∈T—is checked, process flow then proceeding to Step S2009 (Step S2008).

If the transition destination $q_d$ exists, then process flow proceeds to Step S2007. In cases other than that described here, process flow proceeds to Step S2010 (Step S2009).

The state q is set to $q_o$, with process flow proceeding to Step S2006.

The procedures described above allow the procedure "match input document" to be executed.

By exemplifying cases of the matching conditions 2 illustrated in FIG. 44 and of the input string shown in FIG. 54, the operation of the string matching system of this embodiment will be described below. The matching condition shown in FIG. 44 is that by which the notation of the matching condition in FIG. 52 indicated in Patent Document 3 is made to conform to a format in this embodiment, being logically equivalent to that shown in FIG. 52.

Figure 44:
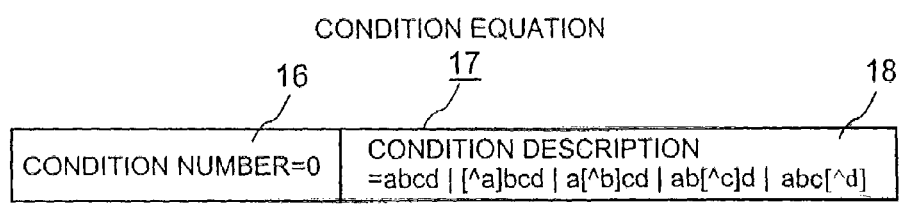
FIG. 44 is an explanatory diagram illustrating a configuration of a matching condition.

By executing a procedure "compile matching condition" shown in Step S51, the state transition table shown in FIG. 45, and the output table shown in FIG. 46 are generated from the matching condition in FIG. 44. Here, the state number of the initial state is set to zero.

The state transition table in FIG. 45 represents in a table the current state 13 stored in the state transition table storage 4, and the next state 15 to the input character 14, e.g., indicating that the next state will be 10 when the state number of the current state is six and the input character, "d." In the figure, a symbol "-" denotes that no next state exists, and the state transition storage 4 can store such a combination without using much memory. As shown in FIG. 53, the conventional finite state automaton with output requires 90 combinations, whereas in an example shown in FIG. 45, information on 46 state transitions may merely be stored, which provides an effect that reduces memory needed to store the state transition table.

The output table in FIG. 46 tabulates the set of the condition number 16 corresponding to the current state 13 stored in the output table storage 5, which indicates, for instance, that when the current state is four, a condition number of zero is outputted.

As an example, FIG. 47 illustrates the operation of the system in a case where an input string of "aaca" is inputted. First, the state q is set to the initial state (state zero). Subsequently, the first character of the string is read, transition being made to State 2—the transition destination of the character "a" in State 0 (zero). Since the transition destination based on the character "a" is defined, it is unnecessary to make reference to $σ_{other}$, which is represented as "unnecessary" in FIG. 47. Next, the second character "a" is read in, and a transition is made to State 5—the transition destination of the character "a" in State 2. Next, the third character "c" is read, and a transition is made to State 5—the transition destination of character "c" in State 9. Next, the fourth character "a" is read, a transition being made to State 12—the transition destination of character "a" in State 9. Input terminates here.

The conventional technique set forth in Patent Document 3 requires seven times of making reference to the state transition table based upon the same conditions, whereas in this embodiment four times of referencing will suffice. In this way, the present invention is directed to prevent the performance degradation due to repeated transition failures, and to enable high-speed string matching, by setting to twice or less per character the reference count of the state transition table due to transition failure.

Here, the matching condition in FIG. 44, which is set forth for the purpose of comparison with the technique set forth in Patent Document 3, has a particular condition in which transitions from the initial state based on all of the characters are allowed. An object of the matching condition shown in FIG. 44 is to identify a matching target string "abcd" even if any one of the characters thereof varies. Without almost varying the object and the meanings of the matching condition, the matching condition in FIG. 44 can be converted into that shown in FIG. 48. This case further reduces the memory needed for the state transition, thus allowing a benefit of the embodiment to be enhanced.

Executing the procedure "compile matching condition" shown in Step S51 generates from the matching conditions 2 in FIG. 48, the state transition table shown in FIG. 49, and the output table shown in FIG. 50. Here, the state number of the initial state is set to zero.

The state transition table in FIG. 49 means the same as that in FIG. 45, and the number of state transitions needed to be stored in the state transition table storage 4 is reduced to 23, which provides a benefit in that further necessary memory is reduced.

Moreover, in terms of the matching conditions 2 in FIG. 48, FIG. 51 illustrates the operation of an input string "xabxd." Since in State 0, the transition destination of the first character "x" of the string is not defined, reference is made to $\sigma_{other}$. However, the transition destination has yet to be defined. The next state is, therefore, set to the initial state, i.e., State 0, when reference is made twice to the state transition table. Hereinbelow, transitions are made to State 3 and State 6 based on the second character "a" and the third character "b," respectively. Since the forth character "x" of the string, the transition destination of the "x" is not defined, reference is made to $\sigma_{other}$, and the next state 1 is obtained. At this moment, reference is made twice to the state transition table. Furthermore, a transition is made to State 2 based on the fifth character "d." Since State 2 has the number zero being present as the condition number 16 turning to be output, this will be outputted. In this case, the reference count of the state transition table reaches seven.

Note that as set forth in Non-Patent Document 1, a general DFA having no output can be deemed to be a special Moore machine that outputs two kinds of information of "accept" and "reject" as the output alphabet. By determining whether or not there simply exists a condition number in a matching result, this embodiment can also configure a string matching system that outputs two kinds of information: "accept" and "reject."

Note that the embodiment described thus far has assumed that an input target and a matching target are "characters," which are not limited to human-readable strings, but applicable to an arbitrary symbol string, and a data string. The characters may be applied to identify, for example, a gene sequence, data measured by a sensor and the like.

It should be noted that although the embodiment described above employs the state transition hash table 35 for the state transition table storage 4, any data structure capable of logically representing a two-dimensional structure table such as a string and a tree structure (a trie), may be used to implement the table storage 4.

It should also be noted that with respect to frequently used states such as the initial state, a data structure such as an array that provides a high access rate may be used, while with respect to less-frequently used states, data structures such as a high memory-efficient hash table and the tree structure, may be used in combination.

It should be noted that although the embodiment described thus far employs the state transition hash table 41 for the state transition table storage 5, any data structure capable of logically representing a one-dimensional structure table such as the tree structure and the hash table, may be employed to implement the table storage 5.

INDUSTRIAL APPLICABILITY

The present invention is applicable to a string matching system.

What is claimed is:

1. A string matching system, comprising:
a state transition table generator for generating a state transition table based on a matching condition described by a regular expression;
a storage device which stores the state transition table generated by the state transition table generator;
an input character reader which extracts input characters one-by-one from an input document; and
an automaton which, in the course of determining whether the matching condition exists for a string of one or more input characters already extracted from the input document, refers to the storage device to make a transition according to the stored state transition table and a current-state and input-character tuple,
wherein if no next-transition destination state with respect to the current-state and input-character tuple exists in the state transition table generated based on the matching condition, then the automaton makes a transition back to its initial state, which is a state before reading the first input character, without proceeding to read the input character of the tuple for which no next-transition destination state exists.

2. The string matching system as recited in claim 1, wherein when a plurality of matching conditions is inputted into the state transition table generator, the state transition table generator merges output descriptions based on state merging, to generate an output table, and the automaton delivers output according to the output table.

3. The string matching system as recited in claim 1, wherein if a transition from an initial state $q_0$ to a predetermined state $q_1$, and a transition from an arbitrary state q to the predetermined state $q_1$, are possible based on a predetermined transition character $\sigma$, then in generating a state transition table, the state transition table generator adds to the state transition table the state transition from the arbitrary state q to the predetermined state $q_1$ based on the predetermined transition character $\sigma$.

4. The string matching system as recited in claim 1, wherein the state transition table generator configures the state transition table according to a hash table.

5. A string matching system, comprising:
a state transition table generator for generating a state transition table based on a matching condition described in a regular expression;
a storage device which stores the state transition table generated by the state transition table generator;
an input character reader which extracts input character one-by-one from an input document; and
an automaton which, in the course of determining whether the matching condition exists for a string of one or more input characters already extracted from the input document, refers to the storage device to make a transition according to the stored state transition table and the current-state and input-character tuple,
wherein if no next-transition destination state with respect to the current-state and input-character tuple exists in the state transition table generated based on the matching condition, then the state transition table generator determines an exclusion character based on which the automaton proceeds to determine whether the matching condition exists according to a tuple comprising the current state and the next input character to be extracted from the input document, to generate a state transition table, wherein the automaton makes a transition to a predetermined state based on the exclusion character.

6. The string matching system as recited in claim 5, wherein if no next-transition destination state with respect to a current-state and input-character tuple exists in a state transition table generated based on the matching condition, then the state transition table generator generates a state transition table based on which the automaton makes a transition to the initial state without proceeding to read the input character of the tuple for which no next-transition destination state exists.

7. The string matching system as recited in claim 5, wherein when a plurality of matching conditions is inputted into the state transition table generator, the state transition table generator merges output descriptions based on state merging, to generate an output table; and the automaton delivers output according to the output table.

8. The string matching system as recited in claim 5, wherein if from a given state there exist a transition destination $q_1$ based on an arbitrary character and a transition destination $q_2$ based on a predetermined character σ, the state transition table generator replaces the arbitrary character with the exclusion character, and further replace transition destination based on the predetermined transition character σ with a state into which the transition destinations $q_1$ and $q_2$ are merged.

9. The string matching system as recited in claim 5, wherein if from a given state a plurality of transition destination states based on the removal character exists, then the state transition table generator replaces the plurality of states with a state into which the plurality of states are merged.

10. The string matching system as recited in claim 5, wherein if in an instance in which the state transition table generator merges a predetermined state $q_1$ with a predetermined state $q_2$, the automaton makes a transition, based on the exclusion character, from the predetermined state $q_2$ to a state $q_3$, and then the state transition table generator merges with the state $q_3$ a state transition destination whose start point is the predetermined state $q_1$.

11. The string matching system as recited in claim 5, wherein the state transition table generator, in generating a nondeterministic finite automaton, generates a state transition assigning transitions based on a metacharacter "." as arbitrary character transitions.

12. The string matching system as recited in claim 5, wherein the state transition table generator in generating a nondeterministic finite automaton, replaces transitions based on the metacharacter [^a] with transitions based on a character a and transitions based on an exclusion character $σ_{other}$.

13. The string matching system as recited in claim 5, wherein if the automaton makes a transition to an identical state, based on a normal character and an exclusion character $σ_{other}$, then the state transition table generator deletes the normal character-based state transitions.

14. The string matching system as recited in claim 13, wherein: when the automaton makes a transition to an identical state based on the normal character and the exclusion character $σ_{other}$, after the normal-character-based state transitions are deleted, a plurality of states in which the automaton makes a transition to an identical state for all characters is merged into one; and the automaton makes a transition to an identical state based on a normal character and an exclusion character $σ_{other}$ after the plurality of states in which the automaton makes a transition to an identical state for all characters has been merged into one, then the normal-character-based state transitions are deleted.

15. The string matching system as recited in claim 5, wherein the state transition table generator configures the state transition table according to a hash table.

16. A string matching method comprising:
executing by a computer, the following steps:
generating a state transition table based on a matching condition described in a regular expression;
storing the state transition table generated by the state transition table generator in a storage device;
extracting input characters one-by-one from an input document; and
in the course of determining whether the matching condition exists for a string of one or more input characters already extracted from the input document, referring to the storage device to make a transition according to the stored state transition table and a current-state and input-character tuple, in such manner that if no next-transition destination state with respect to the current-state and input-character tuple exists in the state transition table generated based on the matching condition, a transition is made back to an initial state, which is a state before reading the first input character, without proceeding to read the input character of the tuple for which no next-transition destination state exists.

17. A string matching method comprising:
executing by a computer, the following steps:
generating a state transition table based on a matching condition described in a regular expression exists for a string in an input document from which input characters are extracted by the computer one-by-one, and if no next-transition destination state with respect to a current-state and input-character tuple exists in a state transition table generated based on the matching condition, determining an exclusion character to generate a state transition table
storing the state transition table in a storage device; and
determining whether the matching condition exists which includes making a transition based on the stored state transition table,
wherein, based on the exclusion character, the determining step makes a transition to a predetermined state, and proceeds to determine whether the matching condition exists according to a tuple comprising the current-state and a next input character to be extracted from the input document.

* * * * *